(12) United States Patent
Alasti et al.

(10) Patent No.: US 7,555,011 B2
(45) Date of Patent: Jun. 30, 2009

(54) SEAMA: A SOURCE ENCODING ASSISTED MULTIPLE ACCESS PROTOCOL FOR WIRELESS COMMUNICATION

(75) Inventors: Mehdi Alasti, College Park, MD (US); Nariman Farvardin, Potomac, MD (US)

(73) Assignee: University of Maryland, College Park, College Park, MD (US)

( * ) Notice: Subject to any disclaimer, the term of this patent is extended or adjusted under 35 U.S.C. 154(b) by 1313 days.

(21) Appl. No.: 10/470,411

(22) PCT Filed: Mar. 26, 2001

(86) PCT No.: PCT/US01/09360

§ 371 (c)(1),
(2), (4) Date: Jul. 29, 2003

(87) PCT Pub. No.: WO02/067477

PCT Pub. Date: Aug. 29, 2002

(65) Prior Publication Data

US 2004/0109435 A1    Jun. 10, 2004

Related U.S. Application Data

(60) Provisional application No. 60/268,935, filed on Feb. 16, 2001.

(51) Int. Cl.
*H04J 3/18* (2006.01)
*H04J 3/16* (2006.01)
*H04W 4/00* (2006.01)

(52) U.S. Cl. .................... 370/471; 370/329; 370/470; 370/477

(58) Field of Classification Search .......... 370/352, 370/389, 328, 329, 336, 341, 447, 395.21, 370/395.4, 395.41, 468, 465, 470, 471, 472, 370/473

See application file for complete search history.

(56) References Cited

U.S. PATENT DOCUMENTS

| | | | |
|---|---|---|---|
| 5,371,734 A | 12/1994 | Fischer | 370/18 |
| 5,384,777 A * | 1/1995 | Ahmadi et al. | 370/337 |
| 5,506,848 A * | 4/1996 | Drakopoulos et al. | 370/336 |
| 5,671,218 A | 9/1997 | I et al. | 370/252 |
| 5,719,860 A | 2/1998 | Maison et al. | 370/347 |
| 5,802,465 A | 9/1998 | Hamalainen et al. | 455/403 |
| 5,809,024 A | 9/1998 | Ferguson et al. | 370/395 |
| 5,894,474 A | 4/1999 | Maison et al. | 370/347 |

(Continued)

FOREIGN PATENT DOCUMENTS

WO    WO 02/067477    8/2002

OTHER PUBLICATIONS

Tong et al.; pub. No. US 2001/0033560 A1; Pub. Date: Oct. 25, 2001; Filing date: Jan. 19, 2001.*

(Continued)

*Primary Examiner*—Hanh Nguyen
(74) *Attorney, Agent, or Firm*—Jeffrey I. Auerbach; Edell, Shapiro & Finnan, LLC

(57) ABSTRACT

The invention concerns SEAMA, a source encoding assisted multiple access (MAC) protocol, for integrating voice and data traffic in a wireless network. SEAMA exploits the time variations of the speech coding rate, through statistical multiplexing, to efficiently use the available bandwidth and to increase the link utilization.

22 Claims, 6 Drawing Sheets

U.S. PATENT DOCUMENTS

| | | | | |
|---|---|---|---|---|
| 5,953,344 | A * | 9/1999 | Dail et al. | 370/443 |
| 5,953,639 | A | 9/1999 | Weiss et al. | 455/38.1 |
| 5,953,694 | A | 9/1999 | Pillekamp | 704/201 |
| 5,956,621 | A | 9/1999 | Weiss et al. | 455/38.1 |
| 6,016,421 | A | 1/2000 | Weiss et al. | 455/63 |
| 6,069,588 | A | 5/2000 | O'Niell, Jr. | 343/713 |
| 6,075,794 | A | 6/2000 | Ohel | 370/443 |
| 6,091,717 | A | 7/2000 | Honkasalo et al. | 370/329 |
| 6,094,426 | A | 7/2000 | Honkasalo et al. | 370/331 |
| 6,097,931 | A | 8/2000 | Weiss et al. | 455/38.1 |
| 6,128,472 | A | 10/2000 | Harel et al. | 455/31.3 |
| 6,151,332 | A | 11/2000 | Gorsuch et al. | 370/466 |
| 6,151,507 | A | 11/2000 | Laiho et al. | 455/466 |
| 6,169,730 | B1 | 1/2001 | Jacklin et al. | 370/371 |
| 6,226,294 | B1 | 5/2001 | Caves | 370/395 |
| 6,370,117 | B1 * | 4/2002 | Koraitim et al. | 370/232 |
| 6,456,633 | B1 * | 9/2002 | Chen | 370/490 |
| 6,775,254 | B1 * | 8/2004 | Willenegger et al. | 370/329 |
| 6,917,603 | B2 * | 7/2005 | Strawczynski et al. | 370/336 |
| 7,269,159 | B1 * | 9/2007 | Lai | 370/352 |

OTHER PUBLICATIONS

Alasti, M. and Farvardin, N. (Sep. 2000) "SEAMA: A Source Encoding Assisted Multiple Access Proitocol for Wireless Communication" IEEE Journal of Selected Areas in Communications, 18(9).

Alasti, M. and Farvardin, N., "Admission Control Policy for Wireless Networks Subject to a Quality of Service Constraint," Proc. IEEE Wireless Communications and Networking Conference (WCNC '99), pp. 1521-1525, New Orlean, Sep. 1999.

Alasti, M. and Farvardin, N., "D-PRMA: A Dynamic Packet Reservation Multiple Access Protocol for Wireless Communications," Proc. Second Annual Workshop on Modelling and Simulation of Wireless and Mobile Systems, pp. 41-49, Seattle, WA, Aug. 1999.

Babich, F., "Analysis of Frame-Based Reservation Random Access Protocols for Micro-cellular Radi Networks," *IEEE Trans. Vehicular Tech.*, vol. 46, pp. 408-421, May 1997.

Barnhart, C. M., Wieselthier, J.E. and Ephremides, A., "An Approach to Voice Admission Control in Multi-hop Wireless Networks," *Proceedings of IEEE INFOCOM'93*, pp. 246-255, Jun. 1993.

Brunk, H. and Farvardin, N., "Fixed-Rate Successively Refinable Scalar Quantizers," *Data Compression Conference*, Snowbird, Utah, IEEE Computer Society Press, pp. 250-259, Mar. 1996.

De Vile, J., "A Reservation Multiple Access Scheme for an Adaptive TDMA Air Interface," Proc. 4th *WINLAB Workshop Third Generation Wireless Inform. Networks*, NJ, Oct. 1993.

Dunlop, J., Irvine, J., Robertson, D. and Cosimini, P., "Performance of Statistically Multiplexed Access Mechanism for TDMA Radio Interface," *IEEE Personal Commun.*, vol 2, pp. 56-64, Feb. 1995.

Ganz, A., Haas, Z. J. and Krishna, C. M., "Multi-Tier Wireless Networks for PCS," *IEEE 46th. Vehicular Technology Conference Mobile Technology for Human Race*, vol. 1, pp. 436-440, Apr. 1996.

Goodman, D. J., Valenzuela, R. A., Gayliard, K. T. and Ramamurthi, B., "Packet Reservation Multiple Access for Local Wireless Communications," *IEEE Trans. Commun.*, vol. 37, No. 8, pp. 885-890, Aug. 1989.

Guerin, R., Ahmadi H. and Naghshineh, H., "Equivalent Capacity and its Application to Band-width Allocation in High-Speed Networks," *IEEE Journal on Selected Areas in Communications*, vol. 9, No. 7, pp. 968-981, Sep. 1991.

Nanda, S., Goodman, D. J. and Timor, U., "Performance of PRMA: A packet voice protocol for cellular systems," *IEEE Trans. Veh. Techno.*, vol. 40, pp. 585-598, Aug. 1991.

Shoham, Y. and Gersho, A., "Efficient. Bit Allocation for an Arbitrary Set of Quantizers,", *IEEE Trans. Acoustics, Speech, and Signal Process.*, vol. 36, No. 9, pp. 1445-1453, Sep. 1988.

Wieselthier, J. E. and Ephremides, A., "Fixed- and Movable-Boundary Channel-Access Schemes for Integrated Voice/Data Wireless Networks," *IEEE Transactions on Communications*, vol. 43. No. 1, pp. 64-74, Jan. 1995.

* cited by examiner

State 1: | 1 |

State 2: | 1 | | 2 |

State 3: | 1 | | 2 | | 3 | | 4 |

State 4: | 1 | | 2 | | 3 | | 4 | | 5 | | 6 | | 7 | | 8 |

SEAMA: A SOURCE ENCODING ASSISTED MULTIPLE ACCESS PROTOCOL FOR WIRELESS COMMUNICATION

CROSS-REFERENCE TO RELATED APPLICATIONS

This application is a continuation-in-part to U.S. Provisional Patent Application Ser. No. 60/268,935 filed Feb. 16, 2001.

USE OF GOVERNMENTAL FUNDS

This invention was made with government support under contract number DAAL019620002 awarded by the Army Research Laboratory. The government has certain rights in the invention.

FIELD OF THE INVENTION

The present invention concerns a computer-controlled decisional process for increasing the efficiency of the use of bandwidth by wireless communication devices, and a computer system that implement such process.

BACKGROUND OF THE INVENTION

The increasing use of wireless communication devices (telephones, 2-way radios, personal digital assistants (PDAs), personal computers, etc.) has led to a corresponding demand for advanced wireless telecommunication services. Substantial effort has been expended in efforts to provide wireless voice/data transmission capacity to meet this demand (see, U.S. Pat. Nos. 6,151,507; 6,169,730; 6,151,332; 6,128,472; 6,097,931; 6,069,588; 6,016,421; 5,956,621; 5,953,639; 5,894,474; 5,719,860).

The problem of responding to a need for advanced wireless telecommunication services has been compounded by the fact that existing cellular networks were originally designed only to deliver voice services. In most countries, including the United States, analog voice channels have a bandwidth of from about 300 to 3600 Hertz. Such a low frequency channel does not lend itself directly to transmitting data at a rate of 28.8 kilobits per second (kbps) or even at the rate of 56.6 kbps that is now commonly available using inexpensive wire line modems, and which are now thought to be the minimum acceptable data rates for Internet access. Despite substantial effort, there is still no widely available satisfactory solution for delivering voice and transmitting low cost, high speed data using existing wireless telephone systems (see, U.S. Pat. No. 6,151,332).

Packet switching represents a suitable solution for transmitting voice and data in wireless networks. Packet-based protocols perform statistical multiplexing, leading to greater efficiency than basic TDMA (Time Division Multiple Access), by exploiting the time varying characteristic of speech (see, e.g., Jacklin, W.E., U.S. Pat. No. 6,169,730). However, to maximize the network throughput while maintaining an acceptable level of quality of service (QoS) for voice, both the speech coding algorithm and the network protocol should take into account the statistics of speech and the structure of the network.

Packet Reservation Multiple Access (PRMA) was introduced as a means to integrate voice and data in micro-cellular wireless communication systems (U.S. Pat. Nos. 6,094,426; 6,091,717; 5,953,694; 5,802,465; 5,671,218; 5,371,734; D. J. Goodman, R. A. Valenzuela, K. T. Gayliard and B. Ramamurthi, "Packet Reservation Multiple Access for Local Wireless Communications," IEEE *Trans. Commun.*, vol. 37, No. 8, pp. 885-890, August 1989; S. Nanda, D. J. Goodman and U. Timor, "Performance of PRMA: A packet voice protocol for cellular systems," *IEEE Trans. Veh. Techno.*, vol. 40, pp. 585-598, August 1991). In PRMA, voice and data sub-systems are logically separated. The available bandwidth is dynamically partitioned between voice and data, in the sense that unused voice slots are assigned to data traffic. Furthermore, PRMA exploits the fact that the voice activity has a talk spurt-silence model. This model assumes that voice has its maximum rate during talk spurts and carries no information during silence periods (D. J. Goodman, R. A. Valenzuela, K. T. Gayliard and B. Ramamurthi, "Packet Reservation Multiple Access for Local Wireless Communications," *IEEE Trans. Commun.*, vol. 37, No. 8, pp. 885-890, August 1989). As a result, in PRMA the voice terminals are granted access to the channel only during talk spurts and give up the use of channel during silence periods. On silence-to-talk spurt transitions, a call has to contend similar to Slotted ALOHA to access the channel. Once the call gains access to the channel successfully, it keeps that slot in subsequent frames for the rest of its talk spurt. This contention causes some bandwidth inefficiency because of collision and blank slots that occur during the contention period.

PRMA++ is a variation of PRMA where mobile communication devices ("mobiles") contend to notify their bandwidth requirement via request packet and dedicated bandwidth (J. De Vile, "A Reservation Multiple Access Scheme for an Adaptive TDMA Air Interface," Proc. 4th *WINLAB Workshop Third Generation Wireless Inform. Networks*, NJ, October 1993; J. Dunlop, J. Irvine, D. Robertson and P. Cosimini, "Performance of Statistically Multiplexed Access Mechanism for TDMA Radio Interface," *IEEE Personal Commun.*, vol. 2, pp. 56-64, Febuary 1995). With PRMA++ bandwidth is centrally allocated by the base station to queued requests. However, both PRMA and PRMA++ are based on contention of traffic sources which, if not properly controlled, may lead to instability of operation and inefficient use of bandwidth.

A variation of reservation protocols comprise out-slot access schemes in which slots are grouped into reservation slots and information slots. By subdividing the reservation slots into smaller mini-slots, an unproved access capacity can be achieved (F. Babich, "Analysis of Frame-Based Reservation Random Access Protocols for Micro-cellular Radi Networks," *IEEE Trans. Vehicular Tech.*, vol. 46, pp. 408-421, May 1997).

Enhanced Time Division Multiple Access (E-TDMA) was introduced by Hughes Network Systems (B. S. Atal, V. Cuperman and A. Gersho, *Speech and Audio Coding for Wireless and Network Application*, Boston: Kluwer AcademicPublishers, 1993). In E-TDMA, mobiles are not assigned a slot for the duration of a call but are dynamically assigned slots in groups of full-duplex RF channels. Each channel contains six half-rate time slots so that for a 12-channel group there are a total of 72 slots of which 63 are available for talk spurts and 9 are reserved for control overhead data needed to track the location of talk spurt assignments for each voice signal. When a particular mobile talk spurt ends, the slot in which it was assigned is vacated and can be assigned to a speaker from any other mobile unit in the group with a newly starting talk spurt (B. S. Atal, V. Cuperman and A. Gersho, *Speech and Audio Coding for Wireless and Network Application*, Boston: Kluwer AcademicPublishers, 1993).

In general, for an ongoing call, a speaker is silent roughly 65% of the time in a two way conversation (B. S. Atal, V.

Cuperman and A. Gersho, *Speech and Audio Coding for Wireless and Network Application*, Boston: Kluwer Academic Publishers, 1993). Furthermore, when speech is present, the short-term rate-distortion tradeoff varies quite widely with the changing phonetic character (B. S. Atal, V. Cuperman and A. Gersho, *Speech and Audio Coding for Wireless and Network Application*, Boston: Kluwer AcademicPublishers, 1993). Thus, the number of bits needed to code a speech frame for a given level of perceptual quality varies widely with time. Variable-rate coding of speech is a natural way to achieve reduction in average bit rate. A variable-rate speech coder in each frame has different states and correspondingly different output rates depending on the level of speech activity, e.g. QCELP has 4 states corresponding to encoding rates of 1200, 2400, 4800 and 9600 bps (Qualcomm Inc., "Proposed EIA/TIA Interim Standard—Wideband Spread Spectrum Digital Cellular System Dual-Mode Mobile Station—Base Station Compatibility Standard,"TIA TR45.5, Apr. 21, 1992). The coder selects one of the four rates in each frame by comparing the energy level of the frame with a set of three adaptive threshold levels. The coder operates at its highest rate, 9600 bps, at the highest energy level, and at its lowest rate, 1200 bps, at the lowest energy level. The higher the speech energy level, the higher would be the encoder bit rate. During the pause periods, the acoustic signal is not really "silence". Background noise, at some level, is always present. Also, certain speech sounds have a very low energy level and are random in character and thereby are often confused with background noise, e.g. the f and h sounds in fat and hat (B. S. Atal, V. Cuperman and A. Gersho, *Speech and Audio Coding for Wireless and Network Application*, Boston: Kluwer AcademicPublishers, 1993).

In PRMA the call is assigned the maximum bandwidth when the speaker is in the talk spurt state and no bandwidth in the silence state. As such, PRMA does not take into account the variations of the speech signal within the talk spurt period. For perceptual reasons, it is however generally desirable to reproduce in some fashion the background noise; the original noise can either be encoded at a very low bit rate, or replaced by statistically similar noise talk spurt (comfort noise) generated at the receiver (B. S. Atal, V. Cuperman and A. Gersho, *Speech and Audio Coding for Wireless and Network Application*, Boston: Kluwer AcademicPublishers, 1993). The PRMA protocol does not however send information about the background noise while in the silence state.

A need therefore exists for a multiple access protocol that can integrate voice and data in wireless networks more efficiently than existing protocols. The present invention satisfies this need.

SUMMARY OF THE INVENTION

The invention concerns SEAMA, a source encoding assisted multiple access (MAC) protocol, for integrating voice and data traffic in a wireless network. In a preferred embodiment, SEAMA exploits the time variations of the speech coding rate, through statistical multiplexing, to efficiently use the available bandwidth and to increase the link utilization. In a preferred embodiment, in each frame, SEAMA allocates bandwidth among calls as needed. Ongoing calls are (preferably always) assigned a minimum bandwidth to allow for coding of the background noise during silence periods. An embedded voice encoding scheme is employed to allow the network to control the rate of the calls during congestion by selectively dropping some of the less significant packets, thus causing a graceful degradation of quality. In accordance with the present invention, by employing an appropriate voice coding scheme and exploiting the characteristics of the source encoder in the MAC protocol, SEAMA almost doubles the capacity of the voice section compared to a circuit-switched network while practically maintaining the quality of voice traffic.

In detail, the invention provides a computer-facilitated protocol for partitioning available bandwidth between voice and data compartments of a wireless transmission call of voice and data over a communication network, which comprises:

(A) discretizing the transmission into network frames of fixed length and having an integral number of packets, wherein each such frame is an imbedded bit stream comprising:

(1) a voice compartment for carrying digitally encoded voice packets and an embedded quantizer for providing the network with information on the state of the call; and (2) a data compartment for carrying digital data packets; wherein the voice and data compartments are separated from one another by a movable boundary that limits the maximum size of the voice compartment; and (B) for each frame, using provided information on the state of the call to set the position of the movable boundary and thereby allocate unused portion of the voice compartment of the frame to the data compartment of the frame.

The invention further provides the embodiments of such computer-facilitated protocol wherein packets generated in a current frame are transmitted to the network in the next frame, and/or wherein the embedded quantizer of the voice compartment of a current frame transmits to the network the state of the call of the next frame.

The invention further provides the embodiments of such computer-facilitated protocols wherein packets each such frame additionally comprises a voice set-up compartment comprising mini-slots for adding new calls to the network, and/or wherein the protocol optimizes the relative sizes of the voice and data compartment.

The invention particularly concerns the embodiment of such computer-facilitated protocols wherein the network admits new calls using an admission control policy to determine whether the number of calls is less than $N_{max}$, a network selected maximum number of admissible calls, wherein the admission control policy comprises either:

(A) selecting $N_{max}$ such that the average end-to-end distortion per call, $E[D]$, is less than or equal to a network defined threshold, d; or (B) selecting $N_{max}$ such that the peak-load average distortion, $\overline{E}[D]$, is less than the network defined threshold, d.

The invention further concerns the embodiment of such computer-facilitated protocols wherein the protocol resolves overflow, $E[D|N=N_{max}] \leq d$, or $\overline{E}[D] < d$, where $E[D]$ is the average end-to-end distortion per call, $\overline{E}[D]$ is the peak-load average distortion, $N_{max}$ is a network selected maximum number of admissible calls, and d is network defined threshold of distortion, by selectively dropping packets from the embedded bit stream of some calls, according to an optimal scheduling policy. The invention particularly concerns the embodiment of the computer-facilitated protocol wherein the optimal scheduling policy for resolving overflow comprises the Steps:

(A) Initializing variables $m=0, n_l^{(0)}=0, x_l^{(0)}=x_l^{max}$ for $l= 1, \ldots, L$, and $s^{(0)}=0$, and setting pointer $p=1$, wherein m is the iteration, and wherein for the $m^{th}$ iteration, $n_l^{(m)}$ is the number of calls whose next state is l, $x_l^{(m)}$ is the number of packets per frame associated with state l and $s^{(m)}$ denotes the total assigned bandwidth at the $m^{th}$ iteration and p=1 points to the $1^{st}$ entry in a table that contains a "0" indicating the absence of overflow when no calls have made any request;

(B) (1) updating the variables as follows: $n_l^{(m+1)} \leftarrow n_l^{(m)}$ for l=1, ..., L, l≠r and $n_r^{(m+1)} \leftarrow n_r^{(m)} + 1$; $s^{(m+1)} \leftarrow s^{(m)} + x_r^{(m)}$ in response to a report of the next state of the next call;

(2) determining whether $s^{(m+1)} \leq W$; and (3) if $s^{(m+1)} \leq W$ going to Step (D), if $s^{(m+1)} > W$ going to Step (C);

(C) (1) setting p←p+1;

(2) dropping the $(i+1)^{st}$ packets of all calls in state q;

(3) updating total assigned bandwidth $$s^{(m+1)} = \sum_{l=1}^{L} n_l^{(m+1)} x_l^{(m+1)};$$

(4) determining whether $s^{(m+1)} \leq W$; and (5) if $s^{(m+1)} \leq W$ going to Step (D), if $s^{(m+1)} > W$ going to Step (C); and (D) (1) setting m←m+1;

(2) determining whether all calls in the frame are accounted for;

(3) if all calls in the frame are accounted for, then the overflow has been resolved; if all calls in the frame are not accounted for, going to Step (B).

The invention further concerns a computer specially adapted by a protocol to partition available bandwidth between voice and data compartments of a wireless transmission (call) of voice and data over a communication network, wherein the software enables the computer to:

(A) discretize the transmission into network frames of fixed length and having an integral number of packets, wherein each such frame is an imbedded bit stream comprising:

(1) a voice compartment for carrying digitally encoded voice packets and an embedded quantizer for providing the network with information on the state of the call; and (2) a data compartment for carrying digital data packets; wherein the voice and data compartments are separated from one another by a movable boundary that limits the maximum size of the voice compartment; and (B) for each frame, provide information on the state of the call to the network thereby enabling the network to set the position of the movable boundary and allocate unused portion of the voice compartment of the frame to the data compartment of the frame.

The invention particularly concerns such computers wherein the protocol causes packets generated in a current frame to be transmitted to the network in the next frame and/or wherein the protocol enables the computer to discretize the transmission into network frames each of which additionally comprises a voice set-up compartment comprising mini-slots for adding new calls to the network. The invention also concerns the such computers wherein the protocol enables the relative sizes of the voice and data compartment, in each frame, to be optimized.

The invention particularly concerns the above-described computers in which the protocol enables the network to admit new calls using an admission control policy that determines whether the number of calls is less than $N_{max}$, a network selected maximum number of admissible calls, wherein the admission control policy comprises either:

(A) selecting $N_{max}$ such that the average end-to-end distortion per call, E[D], is less than or equal to the network defined threshold, d; or (B) selecting $N_{max}$ such that the peak-load average distortion, $\overline{E}[D]$, is less than the network defined threshold, d.

The invention additionally concerns a communications network wherein available bandwidth is partitioned between voice and data compartments of a wireless transmission (call) of voice and data by a protocol which:

(A) discretizes the transmission into network frames of fixed length and having an integral number of packets, wherein each such frame is an imbedded bit stream comprising:

(1) a voice compartment for carrying digitally encoded voice packets and an embedded quantizer for providing the network with information on the state of the call; and (2) a data compartment for carrying digital data packets; wherein the voice and data compartments are separated from one another by a movable boundary that limits the maximum size of the voice compartment; and (B) for each frame, provides information on the state of the call to the network thereby enabling the network to set the position of the movable boundary and allocate unused portion of the voice compartment of the frame to the data compartment of the frame.

The invention further concerns the embodiment of the above-described communications network wherein the protocol causes packets generated in a current frame to be transmitted to the network in the next frame and/or wherein the embedded quantizer of the voice compartment is transmitted to the network in a header of the first packet of the digitally encoded voice packets of the voice compartment of the frame. The invention particularly concerns such communications networks, wherein in each frame, the protocol optimizes the relative sizes of the voice and data compartment.

The invention also concerns such communications networks wherein the protocol causes each such frame to additionally comprise a voice set-up compartment comprising mini-slots for requesting permission of the network to add a new call. The invention additionally concerns such communications networks wherein the protocol enables the network to admit new calls using an admission control policy that determines whether the number of calls is less than $N_{max}$, a network selected maximum number of admissible calls, wherein the admission control policy comprises either:

(A) selecting $N_{max}$ such that the average end-to-end distortion per call, E[D], is less than or equal to the network defined threshold, d; or (B) selecting $N_{max}$ such that the peak-load average distortion, $\overline{E}[D]$, is less than the network defined threshold, d.

where E[D] is the average end-to-end distortion per call, $\overline{E}[D]$ is the peak-load average distortion, $N_{max}$ is a network selected maximum number of admissible calls, and d is network defined threshold of distortion.

The invention also concerns such communications networks wherein the protocol enables the network to resolve overflow, $E[D|N=N_{max}] \leq d$, or $\overline{E}[D] < d$, by selectively dropping packets from the embedded bit stream of some calls, according to an optimal scheduling policy. The invention particularly concerns such communications networks wherein the optimal scheduling policy for resolving overflow comprises the Steps:

(A) Initializing variables m=0, $n_l^{(0)}$=0, $x_l^{(0)}=x_l^{max}$ for l=1,..., L, and $s^{(0)}$=0, and setting pointer p=1, wherein m is the iteration, and wherein for the $m^{th}$ iteration, $n_l^{(m)}$ is the number of calls whose next state is l, $x_l^{(m)}$ is the number of packets per frame associated with state l and $s^{(m)}$ denotes the total assigned bandwidth at the $m^{th}$ iteration and p=1 points to the $1^{st}$ entry in a table that contains a "0" indicating the absence of overflow when no calls have made any request;

(B) (1) updating the variables as follows: $n_l^{(m+1)} \leftarrow n_l^{(m)}$ for l=1,..., L, l≠r and $n_r^{(m+1)} \leftarrow n_r^{(m)}+1$; $s^{(m+1)} \leftarrow s^{(m)}+x_r^{(m)}$ in response to a report of the next state of the next call;
 (2) determining whether $s^{(m+1)} \leq W$; and
 (3) if $s^{(m+1)} \leq W$ going to Step (D), if $s^{(m+1)} > W$ going to Step (C);

(C) (1) setting p←p+1;
 (2) dropping the $(i+1)^{st}$ packets of all calls in state q;
 (3) updating total assigned bandwidth $$s^{(m+1)} = \sum_{l=1}^{L} n_l^{(m+1)} x_l^{(m+1)};$$

(4) determining whether $s^{(m+1)} \leq W$; and
 (5) if $s^{(m+1)} \leq W$ going to Step (D), if $s^{(m+1)} > W$ going to Step (C); and (D) (1) setting m←m+1;
 (2) determining whether all calls in the frame are accounted for;
 (3) if all calls in the frame are accounted for, then the overflow has been resolved; if all calls in the frame are not accounted for going to Step (B).

BRIEF DESCRIPTION OF THE FIGURES

FIG. 2B is a schematic representation of the structure of a packet.

FIG. 3B is a schematic representation of Base Station feedbacks in the voice compartment. In the Figure, a binary feedback of "0" indicates that the call is terminated; a binary feedback of "1" indicates that the call is still on.

DESCRIPTION OF THE PREFERRED EMBODIMENTS

Figures 1, 2A:
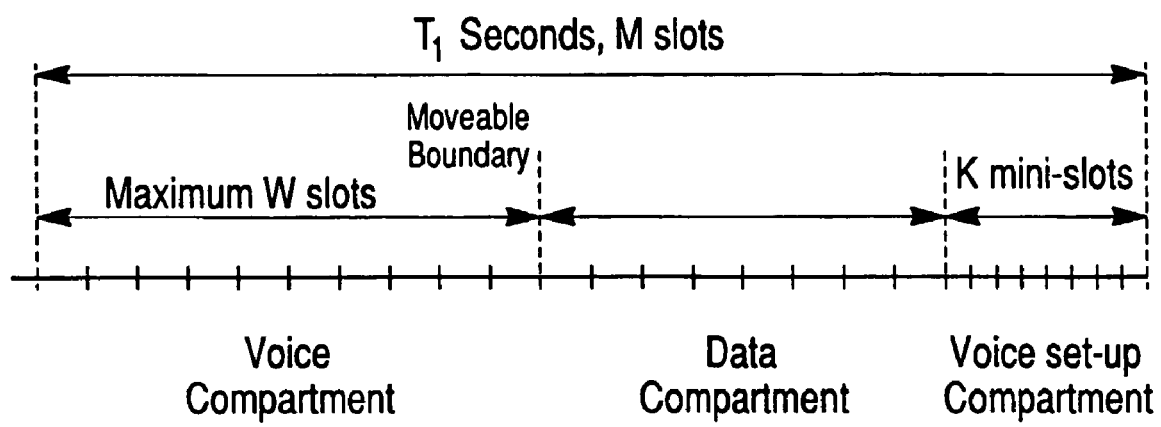
FIG. 1 is a schematic representation of the structure of a frame.
FIG. 2A is a schematic representation of QCELP voice packets.

SEAMA is a source encoding assisted multiple access (MAC) protocol for integrating voice and data traffic in a wireless network. As used herein, the terms "protocol" and "policy" refer to computer-controlled decisional processes employing software and hardware devices, and which involve data analysis and/or processing. The term "computer," as used herein is intended to encompass not only mainframe or base computer systems, but also any device (e.g., personal computers, switching systems, telephones, fax machines, PDAs, 2-way radios, etc.) that is capable of processing voice and data. As used herein, the term "source encoding" is intended to refer to the encoding of a transmission call at the source of the call.

At the application layer in a preferred embodiment of the SEAMA protocol of the present invention, a QCELP-like voice encoder is employed using one or more embedded quantizers. The QCELP-like voice coder is multi-state and has different rates associated with different states. The embedded quantizer provides an output bitstream such that its truncated versions can be used to reconstruct a replica of the quantizer input. The structure of SEAMA at the network layer is similar to the reservation protocols; however, SEAMA exploits the statistics of the voice encoder to optimize the bandwidth assignment among mobiles. In each frame, SEAMA, assigns bandwidth to ongoing calls based on the state of the encoder (state of the call). Thus, SEAMA allocates bandwidth as needed. In this scheme, some minimum bandwidth is allocated to each call for all states. In this way, the background noise during pause periods is coded and reproduced at the receiver. Also, SEAMA avoids contentions due to silence-to-talk spurt transitions. Moreover, having connection with the base station in each frame helps mobiles to keep track of synchronization. Further, SEAMA resolves overflows by selectively dropping packets from the embedded bit stream of some calls, according to an optimal scheduling policy. As a result of these features of SEAMA, a significant gain in network capacity can be achieved by this protocol, e.g. a 100% gain compared to a circuit switched network and a 20% gain compared to PRMA. Moreover, since the quality of the voice traffic degrades gracefully by increasing the number of admitted calls, for the SEAMA protocol the quality of service is less sensitive to network congestion.

The present invention relates includes both the software for implementing the SEAMA protocol, as well as computers and communication networks that employ the SEAMA protocol.

I. The SEAMA Protocol

A. The Main Components of the SEAMA Protocol

The components of the SEAMA protocol of the present invention may be illustrated by considering a micro-cell of a TDMA integrated voice and data wireless network. In such a network, voice terminals (calls) send voice packets and data terminals send data packets to a base station through the up-link, and the base station sends information packets to mobiles through the down-link. The up-link and down-link channels may be considered to be substantially error free and to have negligible propagation delay. The network treats voice and data differently since voice is delay-sensitive, loss-tolerant while data is delay-tolerant and loss-sensitive.

A new call is admitted if it meets the criteria imposed by the network admission control policy; otherwise, it will be blocked. The network gives commitment to an admitted call until the call ends(i.e., it allows the call to send voice packets to the base station so long as it is on. However, the network gives no commitment to the data traffic.

On the up-link, time is discretized to fixed length network frames of $T_f$ seconds, or equivalently, M slots, with one packet per slot (FIG. 1). Each frame comprising three parts: a voice compartment, a data-compartment and a voice set-up compartment. The voice compartment carries voice packets and has a movable boundary limiting its size to W slots. If the total voice traffic request in the current frame is less than W slots, unused slots (preferably all unused slots) would be assigned to the data traffic. The data compartment carries data packets using a modified version of one of the MAC protocols reported in the literature (e.g. Slotted ALOHA or the First-Come-First-Serve (FCFS) Tree Algorithm with feedback (0, 1, e) from the network (D. Bertsekas and R. Gallager, Data Networks. Englewood Cliffs, N.J.: Prentice-Hall 1992). Consisting of K mini-slots, the voice set-up compartment is used for adding new calls (calls trying to enter the system). To contend for entering the system, the new calls send knocks (short packets) containing their identities to the network through the mini-slots.

Speech is basically a variable rate source. For a given fidelity criterion, at any time the rate of speech source depends on the level of voice activity. We assume that the system employs an L-state voice encoder with one distinct rate associated with each state; for instance, QCELP has four states and four rates (Qualcomm Inc., "Proposed EIA/TIA Interim Standard—Wideband Spread Spectrum Digital Cellular System Dual-Mode Mobile Station—Base Station Compatibility Standard," TIA TR45.5, Apr. 21, 1992).

For the purposes of the present invention the terms "state of the encoder" and "state of the call" may be considered interchangeable. The present invention considers the length of the network frame to be equal to the length of the voice encoder frame, e.g. 20 msec for QCELP (Qualcomm Inc., "Proposed EIA/TIA Interim Standard—Wideband Spread Spectrum Digital Cellular System Dual-Mode Mobile Station—Base Station Compatibility Standard," TIA TR45.5, Apr. 21, 1992). Additionally, the voice encoder rate may be set to correspond to an integer number of packets per frame. For example, QCELP produces one of one, two, three or four packets per frame depending on the state of the encoder (FIG. 2A).

Since the number of packets generated by the voice encoder varies with time, a mechanism for allocating bandwidth (available slots in a frame) among ongoing calls is needed. For each call, the packets generated in the current frame are sent in the next frame, i.e. with a one-frame delay. For the QCELP coder, this procedure causes a 20 msec delay which is tolerable in two-way voice communication situations. However, this allows the call to know the next state of the encoder that will be reported to the network by a small number of bits located in the header (FIG. 2B) of the first voice packet. In this manner, the call requests the exact bandwidth it needs in the next frame.

B. The Scheduling for the Voice Compartment

In a preferred embodiment of SEAMA, the network keeps a scheduling list containing the identities and the states of all ongoing calls in the current frame. Preferably, each call can keep track of its location in the scheduling list. Calls send their voice packets in the order of their locations in the scheduling list. At the beginning of a frame, the first call in the scheduling list sends its packets in the order of their significance. Upon receiving the voice packets of this call, the network determines the state of the call in the next frame (by inspecting the header of the first packet) and updates the scheduling list accordingly. Next, the second call in the scheduling list sends its voice packets, and the same procedure repeats. In this manner, the network collects the next states of the calls and updates the scheduling list for the next frame. When a call ends, the network removes the identity and next state of the call from the scheduling list and adds any newly admitted calls to the end of the scheduling list.

Figure 3A:
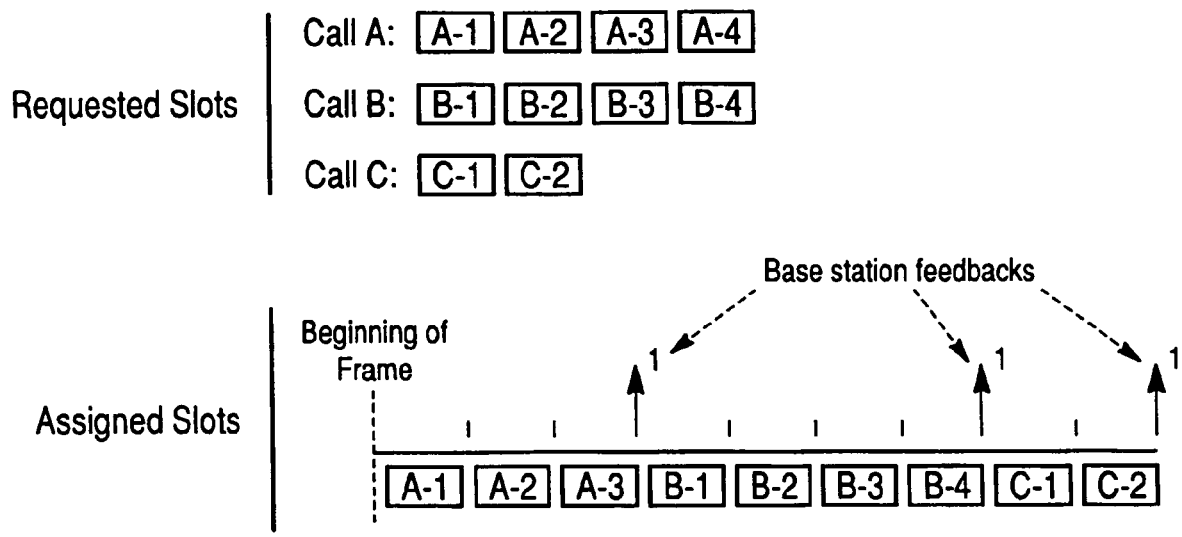
FIG. 3A is a schematic representation of how packet A-4 is gated out by a wireless network.
Figure 3B:
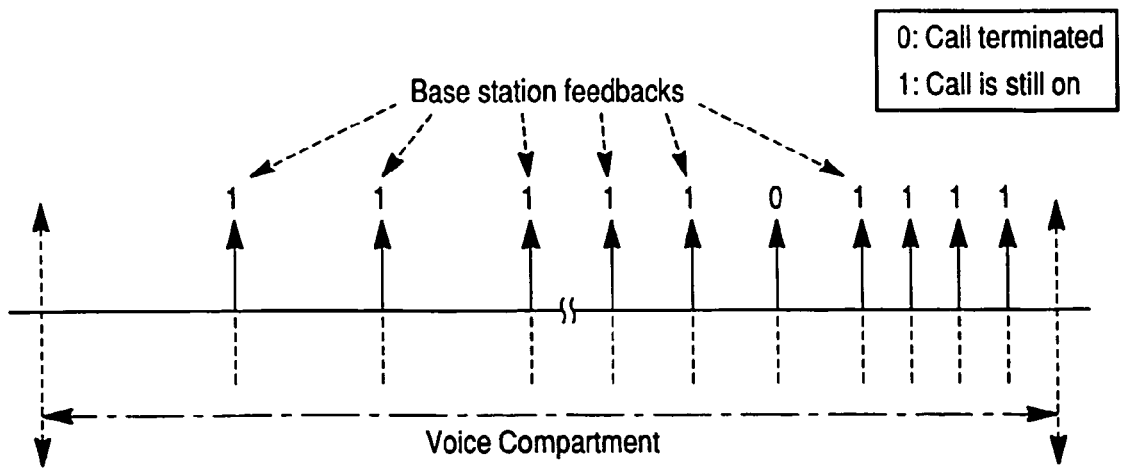

The network handles the slot assignment procedure using the next states of the calls as well as their locations in the scheduling list. To communicate the allotted number of slots to the calls, the network sends feedback to all calls (and preferably to data terminals as well). Specifically, at the end of the last slot assigned to a call the network sends a binary feedback ("0" or "1") to all calls signaling the end of transmission for the current call and the start of transmission for the next call in the scheduling list. This way, the network can control slot assignment by gating voice packets (FIG. 3A). Further, a "0" on the feedback indicates that the call has terminated and must be cleared from the scheduling list, and a "1" indicates that the call is still on (FIG. 3B). Since the implementation of any of the MAC protocols for handling the data traffic normally requires feedback, the use of feedback for the voice traffic does not impose an extra burden on the network.

If the total requested bandwidth for the next frame exceeds W, an overflow has occurred. The problem of overflow is discussed below in conjunction with a proposed flow control mechanism to resolve it (see, "Flow Control Mechanism"). In brief, however, when overflow occurs some of the calls selectively drop some low-importance packets. Consequently, the actual assigned bandwidth to a call may be less than the requested bandwidth. On the other hand, if the total requested bandwidth is less or equal to W, the free slots in the voice compartment will be made available for the data traffic, thereby creating a movable boundary for the voice compartment.

C. SEAMA Data Compartment and Voice Set-Up Compartment

In accordance with the SEAMA protocol of the present invention, the boundary of the data compartment depends on the movable boundary of the voice compartment. As mentioned above, data packets are sent using a slight modification of one of the several MAC protocols in the literature. The modification accounts for the fact that during the voice compartment transmission, the data traffic cannot access the channel. Alternative protocols for handling the data traffic in an integrated voice and data, wireless network have been proposed (J. E. Wieselthier and A. Ephremides, "Fixed- and Movable-Boundary Channel-Access Schemes for Integrated Voice/Data Wireless Networks," *IEEE Transactions on Communications*, vol. 43. No. 1, pp. 64-74, January 1995).

In accordance with the SEAMA protocol of the present invention, ongoing calls keep on sending packets through the channel; therefore, in each frame only new calls need to contend for reservation. The new calls send their knocks in the voice set-up compartment using the Tree Algorithm with the first modification (D. Bertsekas and R. Gallager, Data Networks. Englewood Cliffs, N.J.: Prentice-Hall 1992). In accordance with the Tree Algorithm, all new arriving calls send their knocks on the first mini-slot of the voice set-up compartment. A blank indicates that there is no new calls in this frame. A successful transmission means that there is only one new call in this frame that made the reservation successfully. A collision means that there are more than one new call in the frame. In the case of a collision, the Tree Algorithm with the first modification (D. Bertsekas and R. Gallager, Data Networks. Englewood Cliffs, N.J.: Prentice-Hall 1992) is applied.

One advantage of the SEAMA protocol of the present invention is the stability of its voice sub-system. This attribute can be illustrated by assuming that an average call holding time $$\left(\frac{1}{\mu_v}\right)$$

is three minutes (A. Ganz, Z. J. Haas and C. M. Krishna, "Multi-Tier Wireless Networks for PCS," *IEEE 46th. Vehicular Technology Conference Mobile Technology for Human Race*, vol. 1, pp.436-440, April 1.996), and the maximum load of the voice traffic $$\left(\frac{\lambda_v}{\mu_v}\right)$$

is less than 100 Erlang, where $\lambda_v$ denotes the call arrival rate. Therefore, for $T_f=20$ msec, $\lambda_v T_f \leq 0.011$. The probability of having greater than or equal to two new calls in a frame is of of the order of $o(\lambda_v T_f)$ (R. W. Wolff, Stochastic Modeling and the Theory of Queues, Prentice Hall, 1988). This suggests that the number of new calls in a frame is less than two with a high probability. As a result, the probability of having contention in a typical frame in SEAMA is small, and therefore the voice section of SEAMA is stable. However, for the Packet Reservation Multiple Access protocol (PRMA), on every silence-to-talk spurt transition a call has to contend for making bandwidth reservation (D. J. Goodman, R. A. Valenzuela, K. T. Gayliard and B. Ramamurthi, "Packet Reservation Multiple Access for Local Wireless Communications," *IEEE Trans. Commun.*, vol. 37, No. 8, pp. 885-890, August 1989; S. Nanda, D. J. Goodman and U. Timor, "Performance of PRMA: A packet voice protocol for cellular systems," *IEEE Trans. Veh. Techno.*, vol. 40, pp. 585-598, August 1991). Hence, the probability of having contention in a frame is not small; the contention causes bandwidth inefficiency and possibly instability (S. Nanda, D. J. Goodman and U. Timor, "Performance of PRMA: A packet voice protocol for cellular systems," *IEEE Trans. Veh. Techno.*, vol. 40, pp.585-598, August 1991).

D. SEAMA Flow Control Mechanism

A "flow control mechanism" determines the rate assignment among calls to avoid network congestion. As mentioned above, in a preferred embodiment of SEAMA, in each network frame, each ongoing call reports its next state to the network. As a consequence, at the end of a frame, the network knows the number of calls in each state as well as the total requested bandwidth for the next frame. If the total requested bandwidth is greater than the voice compartment capacity, W, congestion has happened (or equivalently, an overflow has occurred). To resolve the overflow while providing the best QoS for the voice traffic, a preferred embodiment of the present invention uses a voice encoder that produces an embedded bit stream within each state. The flow control mechanism of the proposed SEAMA protocol takes advantage of the hierarchical structure of the embedded encoder bit stream to selectively drop low-significance packets and thereby avoid overflow.

An embedded source code produces a sequence of source descriptions with the property that early descriptions are contained (embedded) within later descriptions. Each source description, except the first, may be decomposed into its prior source description and any incremental descriptions. The source descriptions can be decoded by the receiver to obtain a sequence of source reconstructions with decreasing expected distortions (H. Brunk and N. Farvardin, "Fixed-Rate Successively Refinable Scalar Quantizers," *Data Compression Conference*, Snowbird, Utah, IEEE Computer Society Press, pp. 250-259, March 1996).

The fact that the total assigned bandwidth to the voice traffic (or equivalently the length of the voice compartment) will be the minimum of $S_N(t)$ and W is established as follows. Let N(t) denote the random process representing the number of ongoing calls in the $t^{th}$ network frame, and let $N_l(t)$ denote the random process representing the number of calls in state l in the $t^{th}$ network frame, where $l=1, \ldots, L$. Let $x_l^{max}$ denote the requested bandwidth in terms of the number of slots per frame for a call in state l, e.g. $x_1^{max}=1$, $x_2^{max}=2$, $x_3^{max}=4$, $x_4^{max}=8$ slots for the QCELP coder. The requested bandwidth for the $j^{th}$ call in the $t^{th}$ frame is a random process denoted by $Y_j(t)$ that takes one of the values of $x_l^{max}$'s. The total bandwidth requested by the voice traffic in the $t^{th}$ frame is:

$$S_N(t) = \sum_{l=1}^{L} N_l(t) x_l^{max} = \sum_{j=1}^{N(t)} Y_j(t) \quad (1)$$

As such, the total assigned bandwidth to the voice traffic (or equivalently the length of the voice compartment) will be the minimum of $S_N(t)$ and W.

The QoS for voice signals can be expressed in terms of average distortion per call. The distortion-rate performance of the source encoder in state l can be described by:

$$d = f_l(x), x=1, \ldots, x_l^{max}, l=1, \ldots, L, \quad (2)$$

where x is the rate in terms of the number of slots per frame. The maximum rate in state l is $x_l^{max}$ slots. In other words, if in any frame the voice encoder is in state l, then the coder rate, x, should be an integer in $\{1, 2, \ldots, x_l^{max}\}$. The flow control mechanism of the preferred embodiment of SEAMA promises to assign at least one slot to a call as is shown in Equation (2). To maximize the QoS, the network minimizes the average distortion per call. It is reasonable to conclude that $f_l(.)$'s are decreasing and convex. Therefore, in state l, the highest rate, $x_l^{max}$, provides the lowest distortion, and in the absence of an overflow, $x_l^{max}$ is the optimal rate.

In cases where overflow has occurred, the average distortion may be minimized by assigning all calls in the same state to the same rate. This is because the distortion-rate performances are reasonably assumed to be convex. To illustrate this aspect of the invention, a bandwidth of b slots may be split into x and y between two calls in state l, i.e., x+y=b. Because $f_l(.)$ is convex, $$\frac{1}{2}(f_l(x)+f_l(y)) \geq f_l\left(\frac{x+y}{2}\right) = f_l\left(\frac{b}{2}\right). \quad (3)$$

Therefore, $$\min_{x,y}\{f_l(x)+f_l(y)\} = 2f_l\left(\frac{b}{2}\right),$$

and the optimal bandwidth assignment is $$x^* = y^* = \frac{b}{2}.$$

Since x* and y* should be integers, $$x^* = \left\lfloor\frac{b}{2}\right\rfloor \text{ and } y^* = \left\lceil\frac{b}{2}\right\rceil.$$

Hence., the rates of all calls in the same state are either the same or maximum one slot apart.

In a preferred embodiment, the SEAMA protocol considers the optimal allocation of rates to calls in different states in the following manner. For a generic frame t, $n_l$ and n denote the number of calls in state l, and the total number of calls, respectively. To obtain the optimal rate assignment, $(x_1^*, \ldots x_L^*)$, which provides the minimum average distortion per call, the following minimization problem must be solved:

$$\min_{x_1,\ldots,x_L} \frac{1}{n}\sum_{l=1}^{L} n_l f_l(x_l) \quad (4)$$

subject to $$\sum_{l=1}^{L} n_l x_l \leq W, 1 \leq x_l \leq x_l^{max} \quad$$

Actually, $x_l^*$'s should be non-negative integers denoting the number of slots allotted to a call in state l.

One aspect of the present invention concerns a low-complexity greedy but optimal algorithm that resolves the overflow problem and determines $x_l^*$'s. In this algorithm, $\Delta_i^{(l)}$, the $l^{th}$ incremental distortion associated with state l, as the distortion reduction caused by appending the $(i+1)^{st}$ packet to the initial i packets of the imbedded speech encoder, i.e., $$\Delta_i^{(l)} = f_l(i) - f_l(i+1), 1 \leq i \leq x_l^{max}-1, l=1,\ldots,L \quad (5)$$

The incremental distortions, $\Delta_i^{(l)}$, for all l's and i's can be enumerated. A table stores a sequence of pairs of indices (l,i) in increasing order of their associated incremental distortions. There is a "0" in the $1^{st}$ location of the table. In the $2^{nd}$ location of the table, there is a pair (l,i) corresponding to the smallest incremental distortion. In the $3^{rd}$ location, the (l,i) pair associated with the next smallest incremental distortion is kept, and so on. There is a pointer p that addresses a location in the table.

The overflow resolution procedure starts at the beginning of a frame, advances one step every time a call reports its next state and ends when the next state of the last call is received. Let m represents the iteration index of the algorithm, or equivalently, the number of calls which have reported their next states since the beginning of the frame. For the $m^{th}$ iteration, $n_l^{(m)}$ and $x_l^{(m)}$ denote the number of calls whose next state is l and the rate (number of packets per frame) associated with state l, respectively and $s^{(m)}$ denotes the total assigned bandwidth at the $m^{th}$ iteration. The overflow resolution algorithm is described in the following section.

E. SEAMA Overflow Resolution Algorithm

1. Initialize the variables: m=0, $n_l^{(0)}$=0, $x_l^{(0)}=x_l^{max}$ for l= 1, ..., L, and $s^{(0)}$=0. Set the pointer p=1. (p=1 points to the $1^{st}$ entry in the table that contains a "0" indicating the absence of overflow when no calls have made any request.)
2. The next call in the scheduling list reports its next state (e.g., r) to the network. The network updates its variables as follows: $n_l^{(m+1)} \leftarrow n_l^{(m)}$ for l=1, ..., L, l≠r and $n_r^{(m+1)} \leftarrow n_r^{(m)}+1$; $s^{(m+1)} \leftarrow s^{(m)}+x_r^{(m)}$. If $s^{(m+1)} \leq W$, then there is no overflow and so go to Step 4; else, an overflow has occurred and so go to Step 3.
3. Set p←p+1. The $p^{th}$ entry of the table is a pair (q, i), indicating that in order to optimally resolve the overflow, the $(i+1)^{st}$ packets of all calls in state q should be dropped, i.e. $x_q^{(m+1)}$=i and $x_l^{(m+1)}=x_l^{(m)}$ for l≠q. Update the total assigned bandwidth $$s^{(m+1)} = \sum_{l=1}^{L} n_l^{(m+1)} x_l^{(m+1)}.$$

If $s^{(m+1)} \leq W$, then go to Step 4; else the overflow has not been resolved yet, so repeat Step 3.

4. Set m←m+1, indicating that the $(m+1)^{st}$ call has reported its request. If all calls in the frame are accounted for, then go to Step 5; else, proceed to Step 2.
5. This step corresponds to the end of the voice compartment. If the total assigned bandwidth at this step is strictly less than W, it means that some slots in the voice compartment are free. Also, if p≠1, it means that overflow has occurred and has been resolved. In this case, the network will return the free slots to some of those calls that roost recently lowered their rates in Step 4 of the algorithm.

The following theorem demonstrates that this greedy algorithm is optimal.

Theorem 1: If the distortion-rate functions, $fr(.)$ l=1,...,L, are decreasing and convex, then the proposed greedy algorithm for overflow resolution provides the optimal rate assignment minimizing the average distortion per call.

Theorem 1 is proved by mathematical induction. Obviously, the claim holds for m=1. Assuming that for m calls, the algorithm provides the optimal rate assignment, it can be proven that for m+1 calls, the algorithm is optimal as well. To do this, it suffices to show that the packets to be dropped in the optimal rate assignment in the $m^{th}$ step will not be required for the optimal rate assignment in the $(m+1)^{st}$ step. In other words, the optimal rate assigned to state l at the $m^{th}$ step is no less than the optimal rate assigned to the same state at the $(m+1)^{st}$ step.

Let $n_l$ and $x_l$ be the number of the calls and the rate assigned to calls in state l, respectively. Using the modified Lagrange multiplier method, it can be shown that there exists a positive α such that the optimal solution to the constrained problem of Equation (4) is equivalent to the optimal solution to the following unconstrained problem (Y. Shoham and A. Gersho, "Efficient. Bit Allocation for an Arbitrary Set of Quantizers,", *IEEE Trans. Acoustics, Speech, and Signal Process.*, vol. 36, No. 9, pp. 1445-1453, September 1988), $$\min_{x_1,\ldots,x_L}\left\{\sum_{l=1}^{L}n_lf_l(x_l)+\alpha\sum_{l=1}^{L}n_lx_l\right\}. \qquad (6)$$

As shown by Y. Shoham and A. Gersho ("Efficient. Bit Allocation for an Arbitrary Set of Quantizers,", *IEEE Trans. Acoustics, Speech, and Signal Process.*, vol. 36, No. 9, pp. 1445-1453, September 1988), the solution to Equation (6) can be obtained by minimizing each term of the sum separately, i.e.

$$\min_{x_l}\{f_l(x_l)+\alpha x_l\},\quad l=1,\ldots,L.$$

Significantly, the same a appears for all the terms independently of l as that the optimizing value $x_l^*$'s is a non-increasing function of $\alpha$ (Y. Shoham and A. Gersho, "Efficient. Bit Allocation for an Arbitrary Set of Quantizers,", *IEEE Trans. Acoustics, Speech, and Signal Process.*, vol. 36, No. 9, pp. 1445-1453, September 1988). In other words, as $\alpha$ increases, the minimizing values of $x_l^*$'s decrease or remain unchanged, independently of l.

At the $m^{th}$ step of the algorithm, the network obtains the optimal solution to Equation (4) for m calls. Equivalently, at the $m^{th}$ step of the algorithm, there exists a positive $\alpha^{(m)}$ corresponding to Equation (6). At the next step, the $(m+1)^{st}$ call in the scheduling list reports its next state. Since the size of the voice compartment is limited to W, if an overflow occurs, the rate assignment of at least one of the states has to decrease. Because the optimal rate for this state is a non-increasing function of the value of $\alpha^{(m+1)}$, this suggests that $\alpha^{(m+1)}\geq\alpha^{(m)}$. However, $\alpha^{(m+1)}$ is the same for all states, independently of l. Therefore, as the algorithm proceeds, the Lagrange multiplier coefficient increases or remains unchanged, and the optimal rates for all states decrease. or remain unchanged. As a result, to achieve the optimal solution in a given step, the algorithm never needs those packets that have been dropped in previous steps; therefore, the iterative greedy algorithm provides the optimal solution.

F. SEAMA Admission Control Policy

As mentioned above, the time variations of the voice encoder rate cause fluctuations in the total requested bandwidth of the voice traffic, which may possibly result in overflow. Obviously, the larger the number of calls admitted in the network, the more often will such overflows will occur. The resolution of the overflow results in some degradation in the QoS. The procedure-used for determining the maximum number of admissible calls ($N_{max}$) such that the end-to-end QoS does not degrade drastically is called the network "admission control policy." In a preferred embodiment, the present invention exploits either of two different admission control policies, each of which provides an $N_{max}$ to satisfy one of two different QoS constraints. Suitable admission control policies are described by M. Alasti and N. Farvardin, "Admission Control Policy for Wireless Networks Subject to a Quality of Service Constraint," Proc. IEEE Wireless Communications and Networking Conference (WCNC '99), pp. 1521-1525, New Orlean, September 1999; and M. Alasti and N. Farvardin, "D-PRMA: A Dynamic Packet Reservation Multiple Access Protocol for Wireless Communications," Proc. Second Annual Workshop on Modelling and Simulation of Wireless and Mobile Systems, pp. 41-49, Seattle, Wash., August 1999.

The average end-to-end distortion per call E[D] is a performance measure that can be used in defining the admission control policy. Specifically, it is preferable to use an admission control policy that selects $N_{max}$ such that E[D] is kept below some given threshold, d, i.e., E[D] $\leq$ d. Hereafter, this policy is referred to as Policy-A.

The peak-load average distortion may be defined as $\bar{E}[D]$. $\bar{E}[D]$ represents the average distortion per call when the network is full, i.e., $\bar{E}[D]=E[D|N=N_{max}]$. A second admission control policy, referred to as Policy-B, is defined where $N_{max}$ is chosen so that the peak-load average distortion per call is kept below a given threshold, i.e. $\bar{E}[D]<d$.

In accordance with the present invention, preferred embodiments of SEAMA may employ either of the two admission control policies Policy-A or Policy-B. The performance of Policy-A and Policy-B are discussed in greater detail below (see, "Performance Analysis Of The SEAMA Protocol").

Having now described the preferred embodiments of the SEAMA protocol and its major building blocks, a quantitative performance analysis of the voice section of the proposed protocol is provided below.

II. Performance Analysis Of The SEAMA Protocol

For the purposes of the present invention, it is assumed that all random processes involved in the analysis are stationary and ergodic. Therefore, to evaluate the network performance, it is sufficient to take a "snap shot" at a randomly chosen time t, pick samples of random processes and analyze the network at that time.

For such purposes, N, the number of ongoing calls in the network, is assumed to be a random variable with probability mass function (pmf)

$$P[N=n]=p_n,\ n=0,1,\ldots,N_{max} \qquad (7)$$

$N_{max}$, the maximum number of calls that can be admitted, is determined by the network admission control policy.

Note that $p_n$ is the stationary probability that there are n ongoing calls in the network. However, the probability that an arbitrary call is from a batch of n calls is expressed by the batch pmf $\hat{p}_n$ as given by (W. Wolff, *Stochastic Modeling and the Theory of Queues*, Prentice Hall, 1988)

$$\hat{p}_n=\frac{np_n}{E[N]},\ n=0,1,\ldots,N_{max} \qquad (8)$$

These batch probabilities will later be used to compute the average distortion and average rate on a per call basis.

Each ongoing call corresponds to the output of a variable-rate L-state source encoder. Each state of the encoder is associated with a different level of source activity at the encoder input. The encoder works in such a way that a higher source activity would result in a higher output rate. Furthermore, the encoder produces an embedded output bit stream in each state.

The probability that the encoder is in state 1, L=1, 2, ..., L is denoted by $q_l$. The states of different calls are assumed to be independent of one another and independent of the number of ongoing calls, N. Thus, if random variable $N_l$ denotes the number of calls in state 1, then a multinomial distribution describes the joint pmf of the states of the calls:

$$P[N_1 = n_1, \ldots, N_L = n_L \mid N = n] = \binom{n}{n_1 \ldots n_L} q_1^{n_1} \ldots q_L^{n_L} \quad (9)$$

where $n = n_1 + \ldots + n_L$.

As mentioned in above, $f_l(x)$ denotes the distortion-rate performance of the source encoder in state l, ($l = 1, \ldots, L$), where x is the rate in terms of the number of slots and $x_l^{max}$ is the maximum rate in state l. This means that in state l the source encoder outputs $x_l^{max}$ packets for transmission; if the network cannot deliver all of the $x_l^{max}$ packets, the embedded property of the source encoder makes it possible to reduce its rate to x packets by dropping the $(x_l^{max} - x)$ least significant ones.

Given $n_l$ calls in state l with $n = n_1 + \ldots + n_L$, the total requested bandwidth of the n calls would be $$S_n = \sum_{l=1}^{L} n_l x_l^{max}.$$

In the absence of an overflow ($S_n \leq w$), all calls will be granted the bandwidth they requested. However, in the presence of an overflow ($S_n > W$), the network obtains the optimal rate assignment $(x_1^*, \ldots x_L^*)$ by solving the constrained minimization problem in Equation (4) to avoid congestion. $D(n_1, \ldots, n_L)$, the result of the minimization problem, denotes the average distortion per call conditioned on having $n_1$ calls in state $1, \ldots,$ and $n_L$ calls in state L. Here $x_l^*$ is a non-negative integer denoting the number of slots assigned to a call in state l. However, to simplify the analyses, for the purposes of the present invention it will be assumed that $x_l^*$'s can be non-negative real numbers in $[0, x_l^{max}]$.

Generally, $D(N_1, \ldots, N_L)$ is a function of random variables $N_1, \ldots, N_L$ which specify the number of calls in each state. Thus, the average distortion per call can be computed as $$E[D] = E_N[E_{N_1, \ldots N_L}[D(N_1, \ldots, N_L) \mid N]]. \quad (10)$$

To obtain the average distortion per call, $\hat{p}_n$ is used to compute the expectation with respect to N. From Equations (8), (9) and (10), the following equation is obtained:

$$E[D] = \sum_{n=0}^{N_{max}} \hat{p}_n \left[ \sum_{n_1, \ldots, n_L = n} \binom{n}{n_1, \ldots, n_L} q_1^{n_1} \ldots q_L^{n_L} D(n_1, \ldots, n_L) \right] \quad (11)$$

Also, the peak-load average distortion, $\overline{E}[D] = E[D \mid N = N_{max}]$, is the average distortion per call when the network is full, i.e.

$$\overline{E}[D] = \sum_{n_1 + \ldots + n_L = N_{max}} \binom{N_{max}}{n_1 \ldots n_L} q_1^{n_1} \ldots q_L^{n_L} D(n_1, \ldots, n_L) \quad (12)$$

As shown in Example 1, the average distortion per call, $E[D]$, and the peak-load average distortion $\overline{E}[D]$ are increasing functions of $N_{max}$.

Admission Policy-A obtains $N_{max}$ to keep the average distortion per call below a given threshold, d. As a result, Policy-A solves Equation (11) for $N_{max}$ so that $E[D] \leq d$. Admission Policy-B determines $N_{max}$ from Equation (12) so that $\overline{E}[D] \leq d$. Clearly, Policy-B satisfies the average distortion criterion in Policy-A. As shown in Example 1, Policy-A can accommodate more calls than Policy-B.

The effective bandwidth of a set of connections multiplexed on a link is defined as the amount of bandwidth required to achieve a desired QoS (R. Guerin, H. Ahmadi and h1. Naghshineh, "Equivalent Capacity and its Application to Bandwidth Allocation in High-Speed Networks," *IEEE Journal on Selected Areas in Communications*, vol. 9, NO. 7, pp. 968-981, September 1991). Parallel to Policy-B, W slots per frame is the effective bandwidth for $N_{max}$ calls to keep $\overline{E}[D]$ below the given threshold of Policy-B.

For the purposes of the present invention it is desirable to determine the average rate assigned to a call in the network. Given $n_l$ calls in state l with $n = n_1 + \ldots + n_L$, the average rate assigned to a call would be $$R(n_1, \ldots, n_L) = \frac{1}{n} \min \left\{ \sum_{l=1}^{L} n_l x_l^{max}, W \right\}. \quad (13)$$

Equation (13) is based on observation that in the presence of an overflow the total assigned bandwidth is truncated to W. Therefore, to compute the average rate per call the $\min\{.,.\}$ function is used to pick the smaller value of the total request and W. Taking into account the randomness of states, the average rate per call can be described as:

$$E[R] = E_N[E_{N_1, \ldots, N_L}[R(N_1, \ldots, N_L) \mid N]] \quad (14)$$

III. The Basic Model Of The SEAMA Protocol And Its Mathematical Framework

A. The Call Traffic Model

In this section, the analysis for a "Poisson-Exponential High-Rate" model where the call arrival process is Poisson ($\lambda_v$) and the call duration is exponential ($\mu_v$) is developed. These are two reasonable assumptions for practical situations. Further, the analysis assumes that the high rate approximation holds for the distortion-rate performances of source encoders.

For the purposes of the present invention, call traffic is assumed to be Poisson ($\lambda_v$) with Exponential ($\mu_v$) holding times (C. M. Bamhart, J. E. Wieselthier, and A. Ephremides, "An Approach to Voice Admission Control in Multi-hop Wireless Networks," *Proceedings of IEEE INFOCOM '93*, pp. 246-255, June 1993). The number of ongoing calls is limited to $N_{max}$ so N is a truncated-Poisson ($\rho_v, N_{max}$) random variable (the truncated-Poisson distribution is more commonly addressed in the telecommunications literature as Erlang-B prof or Erlang distribution of the first kind.) where $$\rho v = \frac{\lambda_v}{\mu_v},$$

i.e., for $n = 0, 1, \ldots, N_{max}$ $$p[N = n] = p_n = \frac{\frac{\rho_V^n}{n!}}{\sum_{i=0}^{N_{max}} \frac{\rho_V^i}{i!}} \quad (15)$$

and $$\hat{p}_n = n \frac{\frac{\rho_V^n}{n!}}{\sum_{i=0}^{N_{max}} i \frac{\rho_V^i}{i!}} \qquad (16)$$

Network performance is usually measured by the call blocking probability and network throughput. The call blocking probability, $P_b$, is the probability that a new call finds the system busy (C. M. Barnhart, J. E. Wieselthier, and A. Ephremides, "An Approach to Voice Admission Control in Multi-hop Wireless Networks," *Proceedings of IEEE INFOCOM '93*, pp. 246-255, June 1993); in this case the call cannot go through and would be blocked. By the so-called PASTA property (R. W. Wolff, Stochastic Modeling and the Theory of Queues, Prentice Hall, 1988), the call blocking probability is given by $P[N=N_{max}]$. The network throughput is the average number of ongoing calls. The blocking probability and throughput of the truncated-Poisson ($\rho_v$, $N_{max}$) distribution are (C. M. Barnhart, J. E. Wieselthier, and A. Ephremides, "An Approach to Voice Admission Control in Multi-hop Wireless Networks," *Proceedings of IEEE INFOCOM '93*, pp. 246-255, June 1993)

$$P_b = P[N = N_{max}] = \frac{\frac{\rho_V^{N_{max}}}{N_{max}!}}{\sum_{i=0}^{N_{max}} \frac{\rho_V^i}{i!}} \qquad (17)$$

and $$E[N] = \rho_v(1-P_b) \qquad (18)$$

respectively.

B. The Distortion-Rate Performance

In the Poisson-Exponential High-Rate model, a high rate approximation is used for the distortion-rate performance of the source encoder given by $$f_l(x) = \alpha_l 2^{-2kx}, x \leq x_l^{max}, l=1, \ldots, L \qquad (19)$$

where k is a scaling factor converting the ratre from bps to number of slots (A. Gersho, R. M. Gray, *Vector Quantization and Signal Compression*, Kluwer Academic Publishers, 1992).

Using this assumption, Equation (4) can be solved for the optimal rate assignment and the optimal average distortion per call. In the absence of an overflow, $X_l^* = x_l^{max}$, $l=1, \ldots, L$, and the optimal average distortion per call would be:

$$D(N_1, \ldots N_L) = \frac{1}{N} \sum_{l=1}^{L} n_l \alpha_l 2^{-2l\alpha_l^{max}} \qquad (20)$$

However, in the presence of an overflow, calls have to control their rates and, as shown in Example 2, the average distortion per call would be:

$$D(N_1, \ldots N_L) = \left( \prod_{l=1}^{L} \alpha_l^{\frac{N_l}{N}} \right) 2^{-2k \frac{W}{N}} \qquad (21)$$

Example 2 shows that with the high-rate approximation, the optimal distortion of each call regardless of its state is equal to the average distortion obtained in the Equation (21).

This conclusion permits one to assume that the average distortion in each state of maximum rate are all the same and equal to some constant $\delta$, i.e., $$\delta = \alpha_1 2^{-2kx_1^{max}} = \ldots = \alpha_L 2^{-2kx_L^{max}}. \qquad (22)$$

Therefore, whether there is rate control (corresponding to)) or there is no rate control (corresponding to Equation (20), the distortion of a call is equal to the average distortion independent of its state. As shown in Example 2, by combining Equations (20) and (21), the average distortion per call is $$D(N_1, \ldots N_L) = \delta 2^{2k \frac{1}{N} \{\sum_{l=1}^{L} N_l x_l^{max} - W\}} \qquad (23)$$

where $\{u\}^+ = \max\{0,u\}$, and the exponent is proportional to the average overflow per call. The expression $\mu x$ may be defined as $$\mu x = \sum_{l=1}^{L} q_l x_l^{max},$$

and $$\alpha_{\mathit{ff}} = \prod_{l=1}^{L} \alpha_l^{q_l}.$$

As shown in detail in Example 2, Equation (23) can be rewritten as follows:

$$D(N_1, \ldots N_L) = \delta_{\mathit{eff}} 2^{-2k\{\mu x - \frac{1}{N}\{\sum_{l=1}^{L} N_l x_l^{max} - W\}^+\}}. \qquad (24)$$

The average distortion per call, E[D], is obtained by taking expectation of Equations (23) and (24) with respect to all the random variables involved:

$$E[D] = \qquad (25)$$

$$\frac{\delta}{\sum_{j=0}^{N_{max}} j \frac{\rho_V^j}{j!}} \sum_{n=0}^{N_{max}} n \sum_{n_1+\ldots+n_L=n} \left( \prod_{l=1}^{L} \frac{(p_V q_l)^{n_l}}{n_l!} \right) 2^{\frac{2k}{n}\{\sum_{l=1}^{L} n_l x_l^{max} - W\}^+}$$

and the peak-load average distortion per call is similarly given by:

$$\overline{E}[D] = \frac{\delta}{\sum_{j=0}^{N_{max}} \frac{\rho_V^j}{j!}} \sum_{n_1+\ldots+n_L=N_{max}} \left( \prod_{l=1}^{L} \frac{(p_V q_l)^{n_l}}{n_l!} \right) 2^{\frac{2k}{N_{max}}\{\sum_{l=1}^{L} n_l x_l^{max} - W\}^+} \qquad (26)$$

In Equations (23) and (24), $\sum_{l=1}^{L} N_l x_l^{max}$ represents the total requested bandwidth of all calls having $N_l$ calls in state $1, \ldots,$ and $N_L$ calls in state L. If one considers the i.i.d. random variables $\{Y_j\}_{j=1}^{N}$ where $Y_j$ denotes the requested bandwidth of the $j^{th}$ call, and $P[Y_j=x_l^{max}]=q_l$, $l=1, \ldots, L$, then $\Sigma_{j=1}^{N}Y_j$ is another representation for $S_n$, the total requested bandwidth of all calls. $D_N$ and $R_N$ are defined as follows:

$$D_N = \delta 2^{2k\frac{1}{n}\{S_N-W\}^+} = \alpha_{eff} 2^{-2kT_N} \quad (27)$$

and $$R_N = \frac{1}{N}\min\{S_N, W\}, \quad (28)$$

where, $$T_N = \mu x - \frac{1}{N}\{S_N - W\}^+.$$

The expectations of $D_N$ and $R_N$ in Equations (27) and (28) with respect to all of the random variables involved provide E[D] and E[R], the average distortion and average rate per call, respectively. Thus, $$E[D] = E[D_N] = E\left[\delta 2^{2k\frac{1}{N}\{S_N-W\}^+}\right] = E[\alpha_{eff} 2^{-2kT_N}], \quad (29)$$

and $$\overline{E}[D]=E[D_N|N=N_{max}]=E[\alpha_{eff} 2^{-2kT_{N_{max}}}]. \quad (30)$$

Similarly, the average rate can be written as:

$$E[R] = E[R_N] = E\left[\frac{1}{N}\min\{S_N, W\}\right] = \quad (31)$$

$$= E\left[\frac{1}{N}S_N - \frac{1}{N}\{S_N - W\}^+\right] =$$

$$= E\left[\mu x - \frac{1}{N}\{S_N - W\}^+\right] = E[T_N]$$

Equations (29 and (31) show the relationship between the average distortion, E[D] and the average rate, E[R], per call.

Using the results of Example 2, the probability distribution of $X_l^*$, the optimal rate assigned to a call in state l, is $$P[X_l^* \le y] = \begin{cases} P\left[\left\{\frac{S_N}{N} - \frac{W}{N}\right\} \ge x_l^{max} - y\right] & y < x_l^{max} \\ 1 & y \ge x_l^{max} \end{cases} \quad (32)$$

for $l=1, \ldots, L$. Thus, $$P[X_l^*=x_l^{max}]=P[S_N \le W]. \quad (33)$$

IV. Asymptotic Behavior Of SEAMA For Large Network Loads

This section describes the behavior of the average rate and average distortion per call for the SEAMA protocol of the present invention in two extreme cases of the network load, $\rho v$: (i) when the load is high or (ii) when the load is low.

A. Low Network Loads

For small values of network load overflow is unlikely to happen. Therefore, by using Equations (29) and (31) for small network loads the average distortion and average rate per call are approximately $\delta$ and $\mu x$, respectively. Also to the same reason, $P[X_l^*=x_l^{max}] \approx 1$, $l=1, \ldots, L$.

B. High Network Loads

By assuming that $N \sim$ truncated-Poisson $(\rho_v, N_{max})$, $E[N]=\mu_N$ and $Var[N]=\sigma_n^2$. Moreover, one may assume that $S_N=\Sigma_{j=1}^{N}Y_j$ where $\{Y_j\}_{j=1}^{N}$ are i.i.d. random variables with $E[Y_1]=\mu x$ and $Var[Y_1]=\sigma_x^2$. The variable a may be defined as $\sigma=\sqrt{\sigma_x^2\mu N+\sigma_N^2\mu_x^2}$, $\mu=W-\mu_N\mu_x$ and $$u_n = \frac{W - n\mu x}{\sigma x \sqrt{n}}.$$

As such, for large values of the network load, $\rho v$, $$E[D_N | N = n] = \quad (34)$$
$$\delta[1 - Q(u_n)] + \delta 2^{2k\frac{\sigma X}{\sqrt{n}}\left(\frac{sX}{\sqrt{n}}k\ln 2 - u_n\right)} Q\left(u_n - 2\frac{\sigma X}{\sqrt{n}}k\ln 2\right),$$

$$E[R_N | N = n] = \mu_x + \frac{\sigma X}{\sqrt{n}}\left\{u_n Q(u_n) - \frac{1}{\sqrt{2\pi}}e^{-\frac{1}{2}u_n^2}\right\}, \quad (35)$$

$$E[R] = \mu_X + \frac{\mu}{\mu_N}Q\left(\frac{\mu}{\sigma}\right) - \frac{\sigma}{\sqrt{2\pi}\,\mu}e^{-\frac{\mu^2}{2\sigma^2}}, \quad (36)$$

$$P[S_N > W] = Q\left(\frac{W - \mu_N\mu_X}{\sqrt{\sigma_X^2\mu_N + \sigma_N^2\mu_X^2}}\right), \quad (37)$$

$$P[X_l^* \le y] = Q\left(\frac{W - \mu_N(\mu_X - (x_l^{max} - y))}{\sqrt{\sigma_X^2\mu_N + \sigma_N^2(\mu_X - (x_l^{max} - y))^2}}\right)_{,l=1,\ldots,L}. \quad (38)$$

For large values of $\rho v$, the Central Limit Theorem (CLT) may be employed to compute E[D], $\overline{E}$[D] and E[R] provided by Equations (29), (30) and (31), respectively. For a truncated-Poisson distribution with large values of $\rho v$ and $N_{max}$, $p_n$ and $\hat{p}_n$ are very small for small values of n; so small n's have small contributions in E[D], $\overline{E}$[D] and E[R]. However, by using the CLT for large values of n:

$$\frac{S_n}{n} \to Z_n \sim \mathcal{N}\left(\mu_x, \frac{\sigma_x^2}{n}\right) \text{ in Distribution} \quad (39)$$

By combining (27), (28) and (39), expressions for $D_n$ and $R_n$ are obtained:

$$D_n = \delta 2^{2k\{Z_n - \frac{W}{n}\}^+}, \quad (40)$$

and $$R_n = \min\left\{Z_n, \frac{W}{n}\right\}, \quad (41)$$

As shown in Example 3, $$E[D_N | N = n] = \delta[1 - Q(u_n)] + \delta 2^{2k\frac{\sigma X}{\sqrt{n}}\left(\frac{\sigma X}{\sqrt{n}}k\ln 2 - u_n\right)} Q\left(u_n - 2\frac{\sigma X}{\sqrt{n}}k\ln 2\right).$$

The peak-load average distortion per call is given by $$\overline{E}[D]=E[D_n|N=N_{max}],$$

and likewise, the average distortion per call is $$E[D] = \sum_{n=0}^{N_{max}} \hat{p}_n E[D_N | N = n]. \quad (42)$$

Using a similar argument, the average rate per call given N=n can be computed. As shown in Example 3, $$E[R_N \mid N = n] = \mu_x + \frac{\sigma_X}{\sqrt{n}} \left\{ u_n Q(u_n) - \frac{1}{\sqrt{2\pi}} e^{-\frac{1}{2}u_n^2} \right\}.$$

Similarly, $$E[R] = \sum_{n=0}^{N_{max}} \hat{p}_n E[R_N \mid N = n].$$

As shown in Example 4, $$E[R] = \mu_x + \frac{\mu}{\mu_N} Q\left(\frac{\mu}{\sigma}\right) - \frac{\sigma}{\sqrt{2\pi}\,\mu} e^{-\mu_n^2}.$$

For heavy network loads, overflow happens with some non-zero probability. Example 4 shows that the overflow probability for large $\rho v$'s is given by:

$$P[S_N > W] = Q\left( \frac{W - \mu_N \mu_X}{\sqrt{\sigma_X^2 \mu_N + \sigma_N^2 \mu_X^2}} \right),$$

and therefore, $$P[X_l^* = x_l^{max}] = 1 - P[S_N > W]. \quad (43)$$

Also, as shown in Example 4, for heavy network loads and for $y < x_l^{max}$, $$P[X_l^* \le y] = Q\left( \frac{W - \mu_N(\mu_X - (x_l^{max} - y))}{\sqrt{\sigma_X^2 \mu_N + \sigma_N^2 (\mu_X - (x_l^{max} - y))^2}} \right), l = 1, \ldots, L.$$

This reveals that the distribution of the optimal rates for different states, i.e., $X_l^*$'s, have the same form.

V. Simulation And Numerical Results On The Performance Of The SEAMA Protocol In this section simulation and numerical results are presented to (i) establish the accuracy and usefulness of the above-described analyses, and (ii) provide insight into the performance and behavior of the SEAMA protocol of the present invention. The speech coder is simulated by an encoder that has four states where the state probabilities, $q_i$, i=1, 2, 3, 4, match those of QCELP applied to a long sequence of speech samples from the TIMIT data base ($q_1$=0.585, $q_2$=0.035, $q_3$=0.050, and $q_4$=0.330). The encoder maximum rate are also chosen to match those of QCELP: ($x_1^{max}$=1, $x_2^{max}$=2, $x_3^{max}$=3, $x_4^{max}$=4 and $x_8^{max}$=8). Equation (19) is assumed for the distortion-rate performance of the encoder and k=1.2 is assumed. In addition, W is assumed to equal 200 slots through this section.

A. Accuracy of Analytical Results

Figure 4:
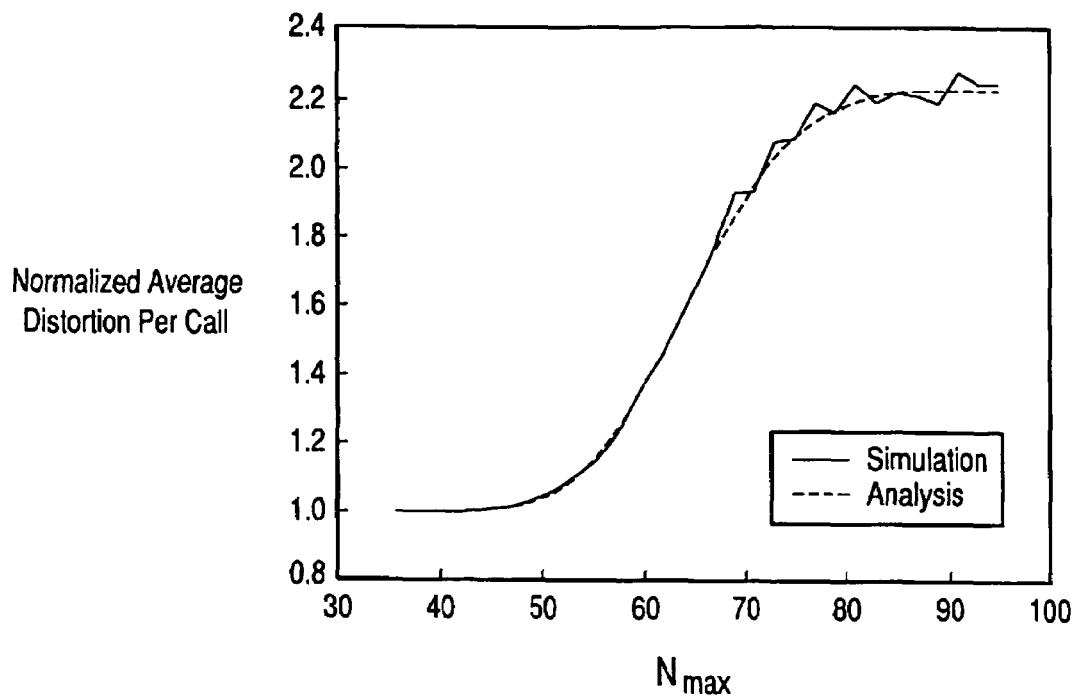
FIG. 4 shows the normalized average distortion per call (the squared-error distortion, E[D]/δ) versus $N_{max}$, for ρv=60 Erlang, for both simulations and analysis.
Figure 5:
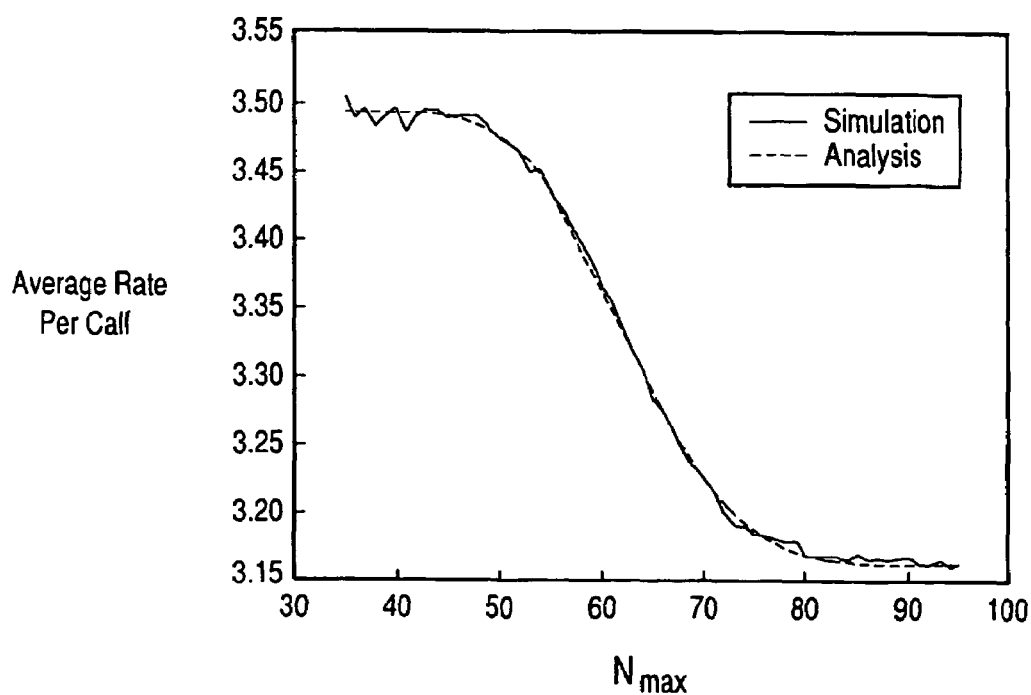
FIG. 5 shows the average rate per call (E[R]) versus $N_{max}$, for ρv=60 Erlang, for both simulations and analysis.

In this subsection, the analytical results are compared with simulation results. FIGS. 4 and 5 show the normalized average squared-error distortion, $E[D]/\delta$, and average rate per call, E[R], respectively, versus $N_{max}$, for $\rho v$=60 Erlang, for both simulations and analysis. Since in this case $\rho v$ is large, the asymptotic formulae for the average distortion and average rate presented above should be used to obtain the analytical results, Equations (42) and (36). As shown in these Figures, for small values of $N_{max}$ the overflow is unlikely to happen; hence, E[D] and E[R] are independent of $N_{max}$ and approximately $\delta$ and $\mu_x$, respectively. On the other hand, for a fixed network load and for large values of $N_{max}$, the average distortion and average rate per call are also independent of $N_{max}$. The reason for this is that for a given $\rho v$, as $N_{max}$ becomes large, the truncated-Poisson distribution approaches a Poisson distribution and E[D] and E[R] become insensitive to $N_{max}$.

Figure 6:
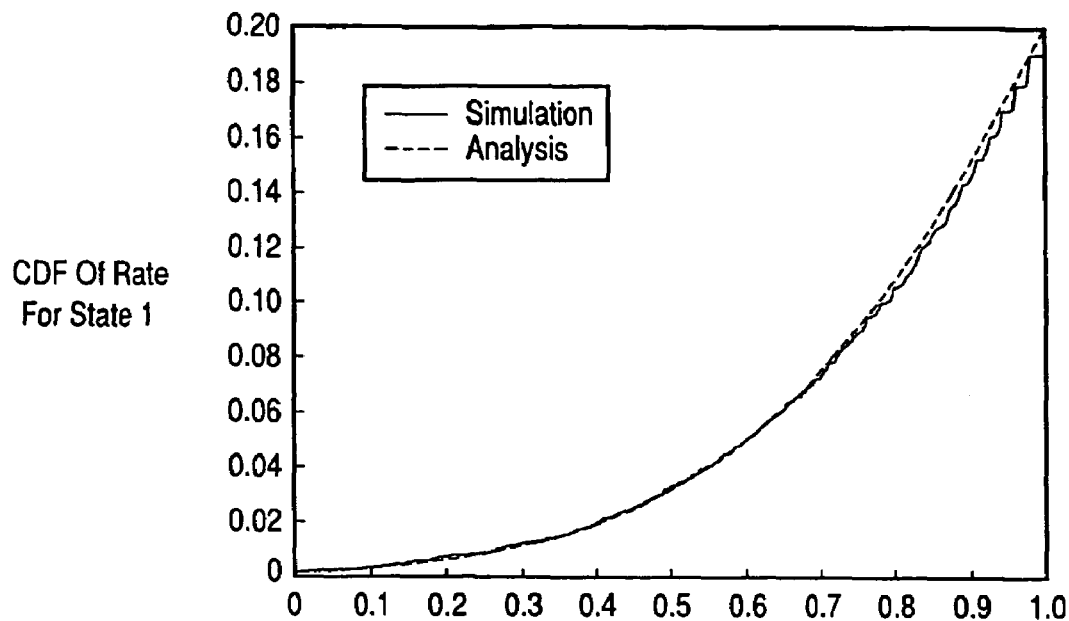
FIG. 6 shows the cumulative distribution function (cdf) of rate for calls in state 1 for 10% additional average distortion for $N_{max}$=55 (i.e., the optimal assigned rate $X_l^*$ to calls in state l for ρv=60 Erlang and $N_{max}$=55.

FIG. 6 shows the cumulative distribution function (cdf) of the optimal assigned rate $X_l^*$ to calls in state 1 for $\rho v$=60 Erlang and $N_{max}$=55. Both the analytical cdf and the empirical cdf obtained from simulations and analytical. Because in this case $\rho v$ is large Equation (38) presented above is used to obtain the analytical result. The cdf of $X_l^*$, l=2,3,4 can be obtained by shifting the cdf from $X_l^{max}$ to $X_l^{max}$. As FIG. 6 shows, $P[X_l^* = x_l^{max}] \ne 0$.

B. Performance of SEAMA

Figure 7:
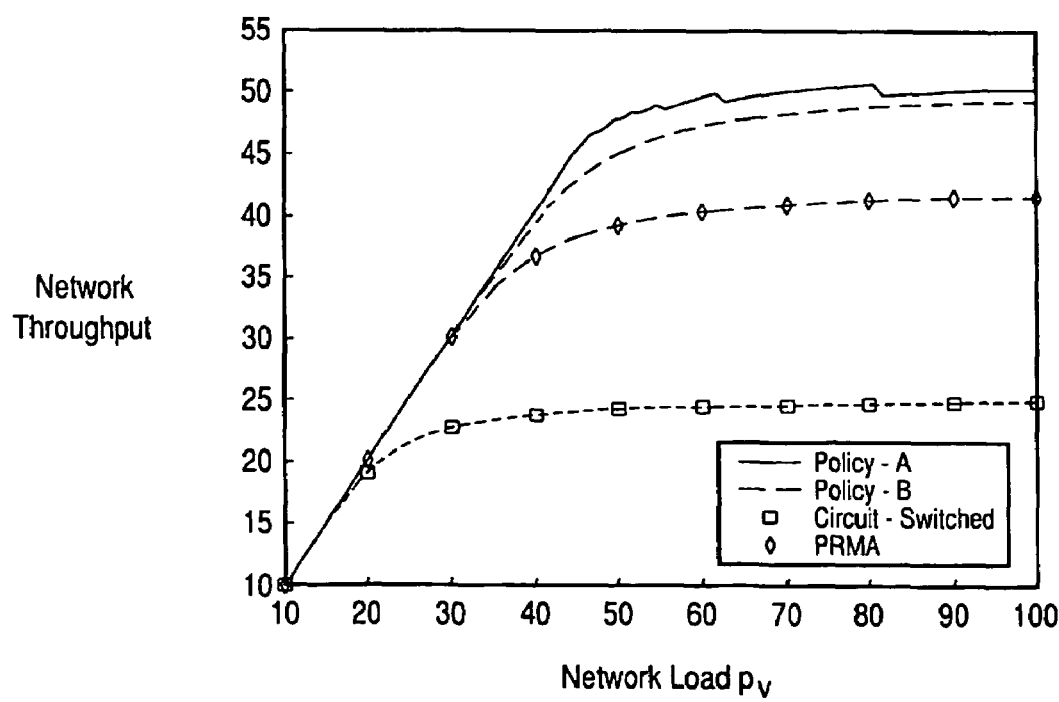
FIG. 7 displays the network throughput versus network load for 10% average additional distortion, for both Policy-A and Policy-B of the SEAMA protocol, PRMA and circuit-switched (i.e., network throughput versus ρv—results).
Figure 8:
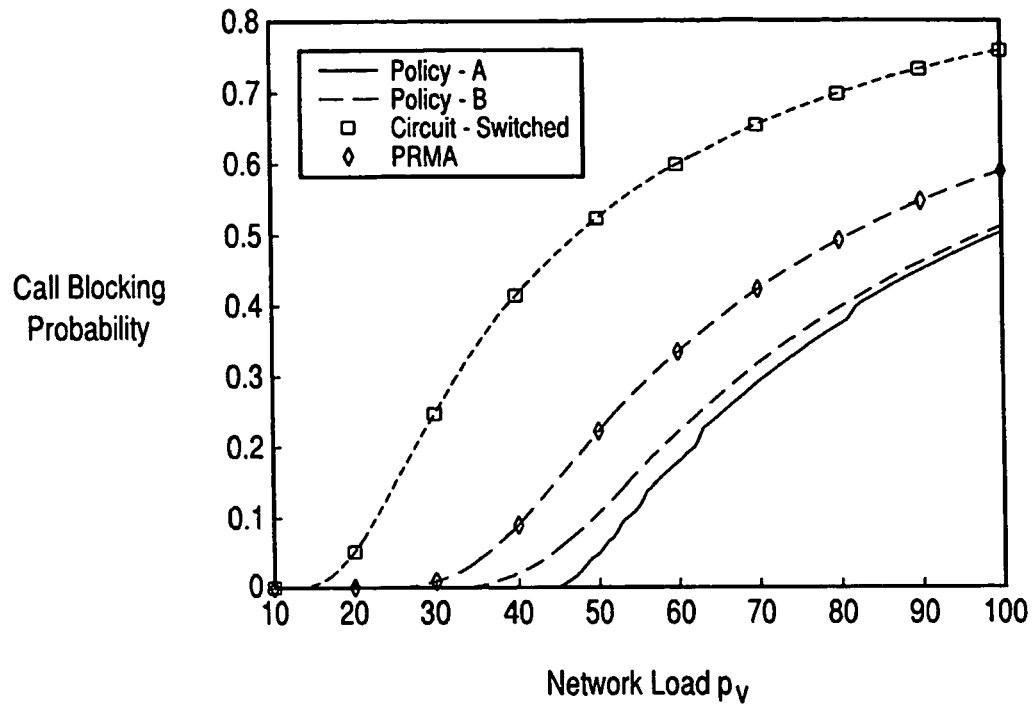
FIG. 8 illustrates the call blocking probability versus network load for 10% average additional distortion, for both Policy-A and Policy-B of the SEAMA protocol, PRMA and circuit-switched (i.e., call blocking probability versus ρv results).

To make a meaningful comparison, we present in FIGS. 7 and 8, performance results for the SEAMA protocol (both Policy-A and Policy-B) as well as for PRMA and a pure circuit-switched network. For the PRMA results, the coder is assumed to produce zero packets (silence periods) with probability $q_1$=0.585 or eight packets (talk spurts) with probability $1-q_1$=0.415.

FIG. 7 displays the network throughput versus $\rho v$—results; FIG. 8 illustrates the call blocking probability versus $\rho v$ results. Here, both admission control policies of SEAMA are designed based on 10% additional average distortion per call, or equivalently 0.6 dB SNR reduction. For the PRMA protocol, the packet dropping probability is kept below 1% to approximately maintain the QoS of the voice traffic (S. Nanda, D. J. Goodman and U. Timor, "Performance of PRMA: A packet voice protocol for cellular systems," *IEEE Trans. Veh. Techno.*, vol. 40, pp. 585-598, August 1991). These parameters are chosen so that all systems are compared at approximately the same QoS level. FIG. 7 reveals that SEAMA with Policy-B increases the network capacity by about 20% compared to the PRMA protocol and by about 100% compared to a pure circuit-switched network. As mentioned above, SEAMA can increase the network throughput by gracefully degrading the QoS. The simulation results further demonstrate that the network throughput can go up to 60 (50% higher than PRMA) if an SNR reduction of 2 dB is allowed. Further, as can be seen in FIG. 8, for sufficiently high network loads, say $\rho v$>50, the call blocking probability associated with SEAMA is markedly lower than for PRMA or circuit-switched networks.

Figure 9:
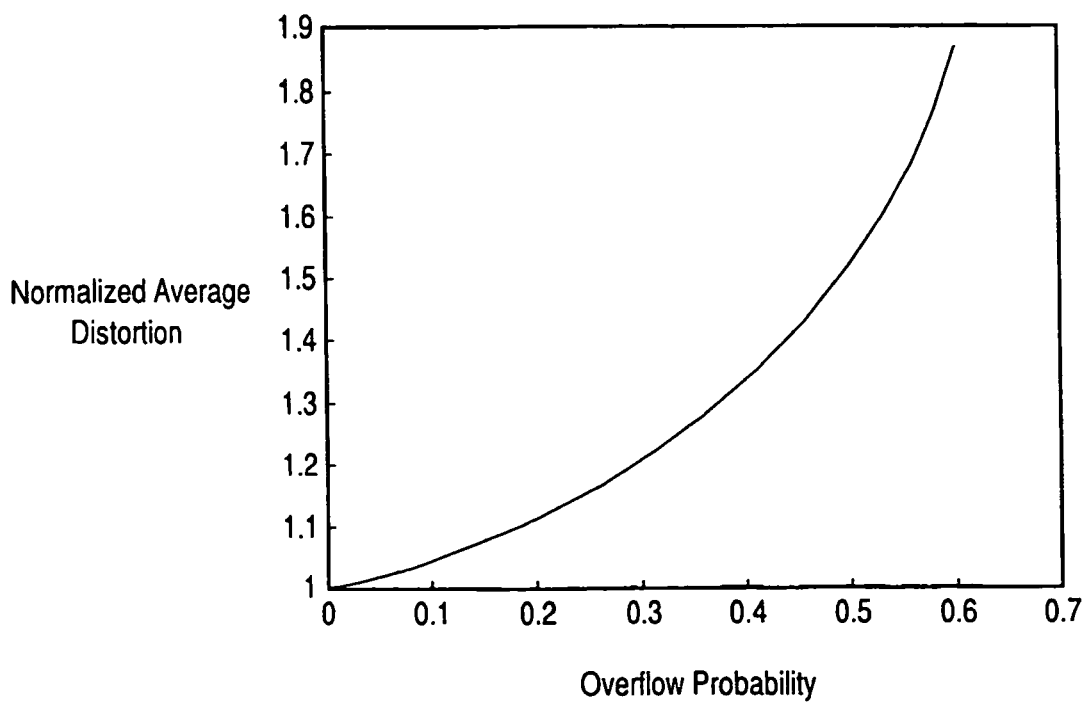
FIG. 9 displays the correspondence between the normalized average distortion per call (E[D]) and the overflow probability for ρv=60 Erlang.

If $\rho v$ is fixed to equal 60 Erlang, and if $N_{max}$ is varied in the SEAMA protocol, different values for E[D] (Equation (42)) and the overflow probability (Equation(37)) are obtained. FIG. 9 displays the correspondence between E[D] and the overflow probability. Significantly, in this figure a 10% increase in average distortion (0.6 dB decrease in SNR) corresponds to approximately 18% overflow probability—a figure far higher than what is typically used in most network designs.

Figure 10:
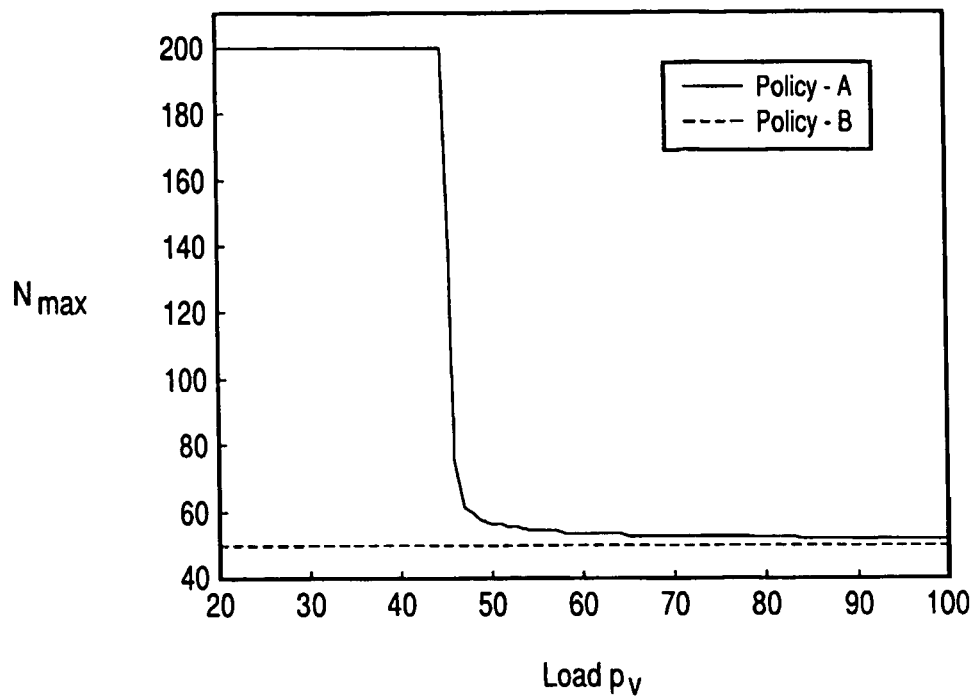
FIG. 10 displays the correspondence between $N_{max}$ for both Policy-A and Policy-B and ρv for 10% additional average distortion per call.

FIG. 10 shows $N_{max}$ for both Policy-A and Policy-B versus $\rho v$ when the additional average distortion per call is kept below 10%. Here, we use Equations (25) and (26) developed above. Because the network load appears only in the distribution of N, Policy-B is independent of $\rho v$. Since for large network loads, N is equal to $N_{max}$ with a high probability, Policy-A asymptotically approaches Policy-B for large $\rho v$'s. As shown in FIG. 10, for Policy-A with small network loads $N_{max}$ could be as high W because overflow is unlikely to happen in this case. Significantly, FIG. 10 shows that $N_{max}$ provided by Policy-A drops sharply at $\rho v$=46 Erlang.

Figure 11:
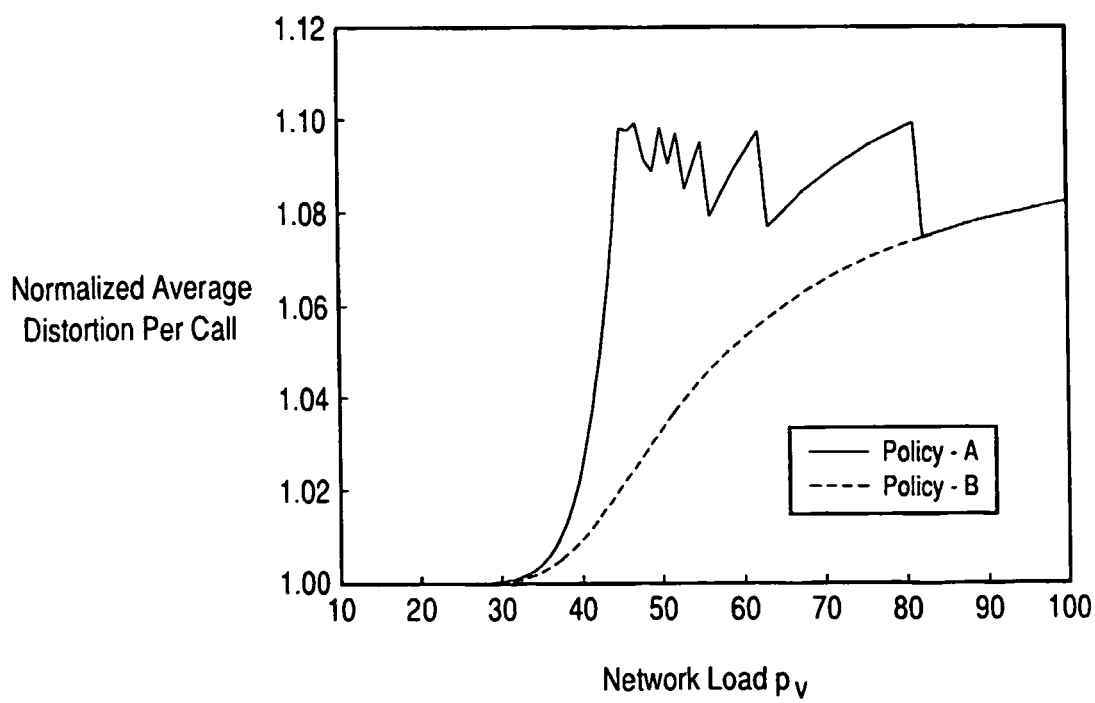
FIG. 11 illustrates the normalized average distortion per call versus network load (ρv) for both Policy-A and Policy-B.

The normalized average distortion per call versus $\rho v$, for both Policy-A and Policy-B are illustrated in FIG. 11. Since Policy-A tries to keep the average distortion below the predetermined threshold, there are fluctuations in the average distortion per call. More specifically, for each network load level, there is an $N_{max}$ that satisfies the permitted additional distortion. When $\rho v$ is increased continuously, at some point $N_{max}$ must be reduced by one unit (discretely) so that E[D] does not exceed the permitted level. This results in a sudden drop in the E[D] and therefore the jagged behavior of Policy-A in FIG. 11. However, for Policy-B, E[D] increases smoothly with $\rho v$ because Policy-B is only concerned with peak average distortion.

In sum, SEAMA provides a flexible protocol for managing packetized access in integrated voice and data wireless networks. The key ideas of the preferred embodiments of SEAMA are: (i) employing a multi-state variable-rate voice encoder to reduce the average, output rate of the encoder and take advantage of statistical multiplexing of voice packets in access protocol, and (ii) exploiting embedded coding within each state of the encoder so as to optimally resolve network congestion while maximizing the QoS of voice traffic. In each frame, the preferred embodiment of SEAMA optimally apportions the available voice traffic: bandwidth among the ongoing calls. To resolve overflows, the preferred embodiments of SEAMA use the embedded property of the voice encoder to optimally drop low significant voice packets, thus decreasing the QoS gracefully. The simulation and analytical results indicate that for a given voice QoS, the preferred embodiments of SEAMA can admit a larger number of calls than is possible with other access protocols. In particular, for heavy network loads, a 100% increase in network throughput is observed compared with circuit-switched networks, and a 20% increase in network throughput is observed compared with PRIMA. In contrast to most network access protocols, in the preferred embodiments of SEAMA an increase in network congestion has a gradual negative impact on the voice QoS (i.e., the notion of soft capacity).

Having now generally described the invention, the same will be more readily understood through reference to the following examples, which are provided by way of illustration, and are not intended to be limiting of the present invention, unless specified. To facilitate an understanding of the Examples, the following Facts are provided:

Fact 1: (Anscombe's Theorem) One assumes that $$S_N = \sum_{j=1}^{N} Y_j$$

where $\{Y_j\}_{j=1}^N$ i.i.d. are random variables with $E[Y_1]=\mu_x$ and $Var[Y_1]=\sigma_x^2$. N is a r.v. with $E[N]=\mu_N=\alpha_{\rho v}$ and $Var[N]=\sigma_N^2$. One additionally assumes that N is almost deterministic in the sense that $$\frac{N}{a_{\rho v}} \to 1$$

in probability as $\rho v \to \infty$.
Then, $$U = \frac{\sum_{n=1}^{N}(Y_n - \mu_X)}{\sigma_X \sqrt{\mu_N}} \to \mathcal{N}(0,1)$$

(P. Billingsley, *Probability and Measure*, John Wiley, Inc., 1991).

Fact 2: If $N \sim \text{Poisson}(\rho v)$, $$V = \frac{N-\mu_N}{\sigma_N} \to \mathcal{N}(0,1)$$

(R. W. Wolff, *Stochastic Modeling and the Theory of Queues*, Prentice Hall, 1988).

Fact 3: For large values of $\rho v$, Poisson ($\rho v$) is almost deterministic. This is proved by considering that for Poisson ($\rho v$) distribution, $\mu_N = \sigma_N^2 = \rho v$; so by Chebycheve's inequality, as $\rho v \to \infty$ $$P\left[\left|\frac{N}{\mu_N} - 1\right| > \varepsilon\right] = P\left[\left|\frac{N}{\rho v} - 1\right| > \varepsilon\right] < \frac{1}{\rho v \varepsilon^2} \to 0. \quad \square$$

Fact 4: If $N \sim \text{truncated-Poisson}(\rho v, N_{max})$, then for large values of $\rho v$ and $\rho v \gg N_{max}$, N is almost deterministic and $\sigma_N^2 \to 0$ as $\rho v \to \infty$. This is proved by considering that $$\sigma_N^2 = \frac{N_{max}}{\rho v} + o\left(\frac{1}{\rho v}\right)$$

EXAMPLE 1

Proof of the Ability of Admission Policy-A and Admission Policy-B to Satisfy the Requirements of the SEAMA Protocol of the Present Invention To prove the ability of Admission Policy-A and Admission Policy-B to satisfy the requirements of the SEAMA protocol of the present invention, the distortion-rate performance $f_l(x_l)$ is assumed to be a convex and decreasing function of $x_l$ (the rate applied to calls in state l) for $l=1, \ldots, L$. By definition:

$$S(n_1, n_2, \ldots, n_L) \triangleq \left\{x_1, x_2, \ldots, x_L; \sum_{l=1}^{L} n_l x_l \leq W, x_l \leq x_l^{max}, l=1, \ldots L\right\}$$

Additionally, $D(n_1, n_2, \ldots, n_L)$ and $g(n_1, n_2, \ldots, n_L)$ are defined as follows:

$$D(n_1, n_2, \ldots, n_L) \triangleq \frac{1}{n} g(n_1, n_2, \ldots, n_L) \triangleq \min_{(x_1,\ldots,x_L) \in S} \frac{1}{n} \sum_{l=1}^{L} n_l f_l(x_l),$$

where $n_1 + \ldots + n_L = n$. The rates $(x_1^*, x_2^*, \ldots, x_L^*)$ minimizing the above minimization problem are termed the optimal rate assignment corresponding to $(n_1, n_2, \ldots, n_L)$.

Lemma 1: For any positive integers $(n_1, n_2, \ldots, n_L)$:

$$g(n_1, n_2, \ldots, n_L) \leq g(n_1+1, n_2, \ldots, n_L)$$

Proof: Assume that the optimal rate assignment corresponding to $(n_1+1, n_2, \ldots, n_L)$ is $x_1^*, x_2^*, \ldots, x_L^*$. Then, $$g(n_1+1, n_2, \ldots, n_L) = \sum_{l=1}^{L} n_l f_l(\hat{x}_l^*) + f_l(\hat{x}_l^*).$$

Additionally, $$\sum_{l=1}^{L} n_l \hat{x}_l^* + \hat{x}_l^* \leq W.$$

-continued

Because $f_l(\hat{x}_l^*) \geq 0$, $$g(n_1+1, n_2, \ldots, n_L) \geq \sum_{l=1}^{L} n_l f_l(\hat{x}_l^*).$$

The function $f_l(.)$ is convex and decreasing; therefore the optimal rate assignment corresponding to $(n_l, \ldots, n_L)$ is on the boundary of $S(n_1, \ldots, n_L)$. However, $(x_1^*, x_2^*, \ldots, X_L^*)$ does not lay on the boundary of $S(n_1, \ldots, n_L)$. Hence $$g(n_1+1, n_2, \ldots, n_L) \geq \min_{x_1, \ldots, x_L \in S} \sum_{l=1}^{L} n_l f_l(x_l) = g(n_1, n_2, \ldots, n_L). \square$$

Lemma 2: For any positive integers $(n_1, n_2, \ldots, n_L)$ so that: $n_1+n_2+\ldots+n_L=n$, $$\frac{1}{n} g(n_1, n_2, \ldots, n_L) \geq \frac{1}{n_1+1} g(n_1+1, n_2, \ldots, n_L).$$

Proof: Case 1: If $0 \leq n_1 \leq n-1$, then by using Lemma 1, the case is obvious.

Case 2: If $n=n_1, n_2=n_L=0$, then, $$\frac{1}{n} g(n_1, n_2, \ldots, n_L) = f_1\left(\frac{W}{n}\right) \leq f_1\left(\frac{W}{n+1}\right) = \frac{1}{n+1} g(n_1+1, n_2, \ldots, n_L)$$

because the function $f_l(.)$ is decreasing. $\square$

Lemma 3: $E[D_N|N=n] \leq E[D_N|N=n+1]$, where $$E[D_N | N = n] = \sum_{n_1+\ldots+n_L=n} \binom{n}{n_1 \cdots n_L} q_1^{n_1} q_2^{n_2} \cdots q_L^{n_L} D(n_1, n_2, \ldots, n_L)$$

and $q_1 \ldots, q_2$ is a pmf.

Proof:

$$D(n_1, n_2, \ldots, n_L) = \frac{1}{n} g(n_1, n_2, \ldots, n_L)$$

$$= \frac{q_1}{n} g(n_1, n_2, \ldots, n_L) + \ldots + \frac{q_L}{n} g(n_1, n_2, \ldots, n_L) \leq$$

$$q_1 \frac{n+1}{n_1+1} D(n_1+1, n_2, \ldots, n_L) + \ldots +$$

$$q_L \frac{n+1}{n_L+1} D(n_1, n_2, \ldots, n_L+1),$$

by Lemma 2. Using the above inequality and the following identity $$\binom{n+1}{n_1+1 \ldots n_L} = \binom{n}{n_1 \ldots n_L} \frac{n+1}{n_1+1},$$

one obtains:

$$E[D_N | N = n] = \sum_{n_1+\ldots+n_L=n} \binom{n}{n_1 \cdots n_L} q_1^{n_1} \cdots q_L^{n_L} D(n_1, n_2, \ldots, n_L) \leq$$

$$\sum_{n_1+\ldots+n_L=n} \binom{n+1}{n_1+1 \cdots n_L} q_1^{n_1+1} \cdots q_L^{n_L} D(n_1+1, n_2, \ldots, n_L) + \ldots +$$

$$\sum_{n_1+\ldots+n_L=n} \binom{n+1}{n_1 \cdots n_L+1} q_1^{n_1} \cdots q_L^{n_L+1} D(n_1, n_2, \ldots, n_L+1) =$$

$$\sum_{m_1+\ldots+m_L=n+1} \binom{n+1}{m_1 \cdots m_L} q_1^{m_1} \cdots q_L^{m_L} D(m_1, m_2, \ldots, m_L) =$$

$$E[D_N | N = n+1]. \square$$

Corollary 1: $E[D_N] \leq E[D_N|N=N_{max}] = \overline{E}[D]$. Therefore, Policy-B satisfies the QoS requirements of Policy-A. As is apparent, the maximum number of calls supported by Policy-A is greater than the maximum number of calls supported by Policy-B.

In sum, the average distortion per call, $E[D]$, and the peak-load average distortion $\overline{E}[D]$ are increasing functions of $N_{max}$. Admission Policy-A obtains $N_{max}$ to keep the average distortion per call below a given threshold, d, and solves Equation (11) for $N_{max}$ so that $E[D] \leq d$. Admission Policy-B determines $N_{max}$ from Equation (12) so that $\overline{E}[D] \leq d$. As shown above, Admission Policy-A can accommodate more calls than Policy-B.

EXAMPLE 2

Proof That The Optimal Distortion of Each Call Regardless Of Its State Is Equal To The Average Distortion Obtained In Equation (21)

High rate approximation: the distortion-rate performances of the speech encoder in state l is assumed to be represented by the function $f_l(x) = \alpha_l 2^{-2kx}$, $x \leq x_l^{max}$, $l=1, \ldots, L$.

Lemma 4: If the high rate approximation holds for the distortion-rate performances of the encoder and if $$\sum_{l=1}^{L} n_l x_l^{max} > W,$$

then $$D(n_1, \ldots, n_L) = \left(\prod_{l=1}^{L} \alpha_l^{\frac{n_l}{n}}\right) 2^{-k \frac{W}{n}},$$

where $D(n_1, n_2, \ldots, n_L)$ is defined as in Example 1.

Proof: By applying the Lagrange Multipliers method for the minimization problem in Equation (4), $$n_l \frac{\partial f_l(x_l)}{\partial x_l} + \lambda n_l = 0, \quad l = 1, \ldots, L;$$

therefore, $$x_l^* = \frac{W}{n} - \frac{1}{2k} \log\left(\frac{\prod_{l=1}^{L} \alpha_l^{\frac{n_l}{n}}}{\alpha_l}\right),$$

$$f_l(x_l^*) = \alpha_l 2^{-2kx_l^*} = \left(\prod_{l=1}^{L} \alpha_l^{\frac{n_l}{n}}\right) 2^{-2k \frac{W}{n}},$$

-continued $$D(n_1, \ldots, n_L) = \left(\prod_{l=1}^{L} \alpha_l^{\frac{n_l}{n}}\right) 2^{-2k\frac{W}{n}}. \quad \square$$

Lemma 5: assume that the distortion for all states without controlling the rates are equal (i.e., $\delta = \alpha_1 2^{-2kx_1^{max}} = \ldots = \alpha_L 2^{-2kx_L^{max}}$). Then $$D(n_1, \ldots, n_L) = \delta 2^{2k\frac{1}{n}\{\sum_{l=1}^{L} n_l x_l^{max} - W\}^+}$$

Proof:

$$\delta = \alpha_l 2^{-2kx_l^{max}}, l = 1, \ldots, L \Rightarrow$$

$$\alpha_l^{\frac{n_l}{n}} = \alpha_1^{\frac{n_l}{n}} 2^{2k\frac{n_l x_1^{max}}{n}} 2^{-2k\frac{n_l x_l^{max}}{n}}, l = 1, \ldots, L$$

As a result, when overflow happens, $$D(n_1, \ldots, n_L) = \left(\prod_{l=1}^{L} \alpha_l^{\frac{n_l}{n}}\right) 2^{-2k\frac{W}{n}}$$

$$= \alpha_1 2^{-2kx_1^{max}} 2^{2k\frac{1}{n}\{\sum_{l=1}^{L} n_l x_l^{max} - W\}}$$

$$= \delta 2^{2k\frac{1}{n}\{\sum_{l=1}^{L} n_l x_l^{max} - W\}}.$$

Since in the absence of overflow, the average distortion is $\delta$, the claim is proven. $\square$ Lemma 6: Assume all of the assumptions made in Lemma 5 hold and define $$\mu_X = \sum_{l=1}^{L} q_l x_l^{max}$$

and $\alpha_{eff} = \alpha_1^{q_1} \ldots \alpha_L^{q_L}$. Then $$D(n_1, \ldots, n_L) = \alpha_{eff}^{-2k\left\{\mu_X - \frac{1}{n}\{\sum_{l=1}^{L} n_l x_l^{max} - W\}^+\right\}}.$$

Proof:

$$\delta = \delta^{q_1} \ldots \delta^{q_L} = \alpha_1^{q_1} 2^{-2kq_1 x_1^{max}} \ldots \alpha_L^{q_L} 2^{-2kq_L x_L^{max}},$$
$$\delta = \alpha_{eff} 2^{-2k\mu_X},$$

and by using Fact 2 the claim is proved. $\square$

Lemma 7: If the assumptions made for Lemma 5 hold, then:

$$X_l^* = x_l^{max} - \left\{\frac{S_N}{N} - \frac{W}{N}\right\}^+, l = 1, \ldots, L.$$

where $S_N = \sum_{l=1}^{L} N_l x_l^{max} = \sum_{j=1}^{N} Y_j$.

Proof: By using Lemma 4, $$X_l^* = \frac{W}{N} - \frac{1}{2k}\log\left(\frac{\prod_{i=1}^{L} \alpha_i^{\frac{N_i}{N}}}{\alpha_l}\right)$$

According to Lemma 5, $$\prod_{i=1}^{L} \alpha_i^{\frac{N_i}{N}} = \alpha_l 2^{-2kx_l^{max}} 2^{2k\frac{S_N}{N}}.$$

As a result, if overflow happens $$X_l^* = x_l^{max} - \left\{\frac{S_N}{N} - \frac{W}{N}\right\}, l = 1, \ldots, L.$$

If overflow does not occur $X_l^* = x_l^{max}$ and so the claim is proven. $\square$ Accordingly, with the high-rate approximation, the optimal distortion of each call regardless of its state is equal to the average distortion obtained in the Equation (21).

EXAMPLE 3

Closed Forms for $E[D_N|N=n]$ and $E[R_N|N=n]$ When the Network Load $\rho v$ is Large This example provides closed forms for $E[D_N|N=n]$ and $E[R_N|N=n]$ when the network load $\rho v$ is large.

$$D_n = \delta 2^{2k\{Z_n - \frac{W}{n}\}^+}, \text{ where } Z_n \sim \mathcal{N}\left(\mu_X, \frac{\sigma_X^2}{n}\right).$$

Therefore, $$E[D_N | N = n] = \int_{-\infty}^{+\infty} \delta 2^{2k\{z-\frac{W}{n}\}^+} \frac{1}{\sqrt{\frac{2\pi}{n}}\sigma_X} e^{-\frac{1}{2}\frac{(z-\mu_X)^2}{\sigma_X^2/n}} dz$$

$$= \int_{-\infty}^{\frac{W}{n}} \delta \frac{1}{\sqrt{\frac{2\pi}{n}}\sigma_X} e^{-\frac{1}{2}\frac{(z-\mu_X)^2}{\sigma_X^2/n}} dz +$$

$$\int_{\frac{W}{n}}^{+\infty} \delta 2^{2k\{z-\frac{W}{n}\}^+} \frac{1}{\sqrt{\frac{2\pi}{n}}\sigma_X} e^{-\frac{1}{2}\frac{(z-\mu_X)^2}{\sigma_X^2/n}} dz$$

The first term in the sum is equal to:

$$\delta P\left[Z_n < \frac{W}{n}\right] = \delta\left[1 - Q\left(\frac{W - n\mu_X}{\sqrt{n}\sigma_X}\right)\right] = \delta[1 - Q(u_n)]$$

The second term is equal to:

$$\delta 2^{2k\frac{\sigma_X}{\sqrt{n}}\left(\frac{\sigma_X}{\sqrt{n}}k\ln 2 - u_n\right)} Q\left(u_n - 2\frac{\sigma_X}{\sqrt{n}}k\ln 2\right)$$

Thus:

$$E[D_N | N = n] = \delta[1 - Q(u_n)] + \delta 2^{2k\frac{\sigma_X}{\sqrt{n}}\left(\frac{\sigma_X}{\sqrt{n}}k\ln 2 - u_n\right)} Q\left(u_n - 2\frac{\sigma_X}{\sqrt{n}}k\ln 2\right)$$

In addition, $$E[R_N | N = n] = \int_{-\infty}^{+\infty} \min\left\{z, \frac{W}{n}\right\} \frac{1}{\sqrt{2\pi}\frac{\sigma_X}{\sqrt{n}}} e^{-\frac{1}{2}\frac{(z-\mu_X)^2}{\sigma_X^2/n}} dz =$$

-continued $$\int_{-\infty}^{\frac{W}{n}} z \frac{1}{\sqrt{2\pi} \frac{\sigma_X}{\sqrt{n}}} e^{-\frac{1}{2}\frac{(z-\mu_X)^2}{\sigma_X^2/n}} dz + \int_{-\infty}^{+\infty} \frac{W}{n} \frac{1}{\sqrt{2\pi} \frac{\sigma_X}{\sqrt{n}}} e^{-\frac{1}{2}\frac{(z-\mu_X)^2}{\sigma_X^2/n}} dz =$$

$$\mu_X - \frac{\sigma_X}{\sqrt{2\pi n}} e^{-\frac{1}{2}\frac{(W-n\mu_X)^2}{\sigma_X \sqrt{n}}} + \left(\frac{W-n\mu_X}{n}\right) Q\left(\frac{W-n\mu_X}{\sigma_X \sqrt{n}}\right). \square$$

Accordingly, with the high-rate approximation, the optimal distortion of each call regardless of its state is equal to the average distortion obtained in the Equation (21).

EXAMPLE 4

The Overflow Probability For Large $\rho v$'s

This Example shows that the overflow probability for large $\rho v$'s is given by:

$$P[S_N > W] = Q\left(\frac{W - \mu_N \mu_X}{\sqrt{\sigma_X^2 \mu_N + \sigma_N^2 \mu_X^2}}\right),$$

and therefore, $$P[X_i^* = x_l^{max}] = 1 - P[S_N 22 W]. \quad (43)$$

Lemma 8: The random variable Z is defined as:

$$Z = \frac{S_N - \mu_N \mu_X}{\sqrt{\sigma_X^2 \mu_N + \sigma_N^2 \mu_X^2}}, \text{ where } S_N = \sum_{j=1}^{N} Y_j \text{ (see Fact 1)}$$

and N is a Poisson ($\rho v$) random variable. Then, $Z \rightarrow N(0, 1)$ in Distribution.

Proof: Define $\alpha = \sigma_x \sqrt{\mu_N}$ and $\beta = \sigma_N \mu_X$. As such, $$Z = \frac{\alpha U + \beta V}{\sqrt{\alpha^2 + \beta^2}}$$

where U and V are defined as in Facts 1 and 2, respectively. Likewise, $E[U]=\mu_U=0$, $E[V]=\mu_v=0$, $E[Z]=\mu_z=0$. Moreover, $$COV_{UV} = \frac{1}{\sigma_X \sigma_N \sqrt{\mu_N}} E\left[N - \mu_N \sum_{i=1}^{N}(Y_i - \mu_x)\right]$$

$$= \frac{1}{\sigma_X \sigma_N \sqrt{\mu_N}} \left(E\left[N \sum_{i=1}^{N} Y_i\right] - \mu_X E[N^2]\right) = 0$$

Thus, U and V are uncorrelated, and, since they are Gaussian, therefore independent. This thus proves the claim.

Lemma 9: Assume that $N \sim$ truncated-Poisson ($\rho v$, $N_{max}$). Then, for the random variable Z (see Lemma 8), $Z \rightarrow N(0, 1)$ in distribution when $\rho v$ is large enough.

Proof: For large values of $\rho v$, if $\rho v < N_{max}$ then the distribution of $\rho v$ can be approximated by Poisson ($\rho v$). In this case, the claim is supported by Lemma 8. For large $\rho v$'s and $\rho v >> N_{max}$, $\beta \rightarrow 0$, as $\rho v \rightarrow \infty$. Thus Fact 1 supports the claim.

Lemma 10: If $N \sim$ truncated-Poisson ($\rho v$, $N_{max}$), i.e., $$p_n = \frac{\frac{\rho_V^n}{n!}}{\sum_{n=0}^{N_{max}} \frac{\rho_V^i}{i!}},$$

then, for large $\rho v$'s:

$$Q\left(\frac{W - \mu_X \mu_N}{\sqrt{\sigma_X^2 \mu_N + \sigma_N^2 \mu_X^2}}\right) = \sum_{n=0}^{N_{max}} Q\left(\frac{W - \mu_X n}{\sigma_X \sqrt{n}}\right) p_n.$$

Proof: By Lemma 9, $$Z = \frac{S_N - \mu_N \mu_X}{\sqrt{\sigma_X^2 \mu_N + \sigma_N^2 \mu_X^2}} \sim N(0, 1).$$

Therefore, $$P[S_N > W] = Q\left(\frac{W - \mu_X \mu_N}{\sqrt{\sigma_X^2 \mu_N + \sigma_N^2 \mu_X^2}}\right).$$

Additionally, $$P[S_N > W] = \sum_{n=0}^{N_{max}} P[S_N > W] p_n.$$

Since N is a truncated-Poisson random variable, and $\rho v$ is large, small n's have a small contribution to the sum. Therefore by applying the CLT for $S_N$, one establishes that:

$$P[S_N > W] = Q\left(\frac{W - \mu_X n}{\sigma_X \sqrt{n}}\right),$$

and proves the claim.

Lemma 11:

$$P[X_i^* = x_l^{max}] = 1 - Q\left(\frac{W - \mu_N \mu_X}{\sqrt{\sigma_X^2 \mu_N + \sigma_N^2 \mu_X^2}}\right)$$

Proof: Using the result of Lemma 10, $$P[X_i^* = x_l^{max}] = P[\text{No Overflow}]$$

$$= P[S_N \leq W]$$

$$= P\left[\frac{S_N - \mu_N \mu_X}{\sqrt{\sigma_X^2 \mu_N + \sigma_N^2 \mu_X^2}} \leq \frac{W - \mu_N \mu_X}{\sqrt{\sigma_X^2 \mu_N + \sigma_N^2 \mu_X^2}}\right]$$

$$= 1 - Q\left(\frac{W - \mu_N \mu_X}{\sqrt{\sigma_X^2 \mu_N + \sigma_N^2 \mu_X^2}}\right).$$

Lemma 12: For $y<x_l^{max}$, and $l=1,\ldots,L$ and large $\rho v$'s $$P[X_l^* \le y] = Q\left(\frac{W - \mu_N(\mu_X - (x_l^{max} - y))}{\sqrt{\sigma_X^2 \mu_N + \sigma_N^2(\mu_X - (x_l^{max} - y))^2}}\right)$$

Proof: According to Example 2, $$P[X_l^* \le y] = P\left[\frac{S_N}{N} \ge (x_l^{max} - y) + \frac{W}{N}\right] = \sum_{n=0}^{N_{max}} P\left[\frac{S_n}{n} \ge (x_l^{max} - y) + \frac{W}{n}\right] p_n$$

However, $$\frac{S_N}{n} \sim \mathcal{N}\left(\mu_X, \frac{\sigma_X^2}{n}\right)$$

for $n$'s that have large contributions in the above summation. Therefore, $$P[X_l^* \le y] = \sum_{n=0}^{N_{max}} Q\left(\frac{W - (\mu_X - (x_l^{max} - y))n}{\sigma_X \sqrt{n}}\right)$$

By replacing $\mu_x$ with $\mu_x - (x_l^{max} - y)$ in the result of Lemma 10, the claim is proved. □

Lemma 13: The average rate per call is $$E[R] = \mu_X + \frac{\mu}{\mu_N} Q\left(\frac{\mu}{\sigma}\right) - \frac{\sigma}{\sqrt{2\pi}\,\mu_N} e^{-\frac{\mu^2}{2\sigma^2}},$$

where $\sigma = \sqrt{\sigma_x^2 \mu_N + \sigma_N^2 \mu_x^2}$, $\mu = W - \mu_N \mu_x$.

Proof:

$$E[R] = E\left[\mu_X - \frac{1}{N}\{S_N - W\}^+\right].$$

$$E\left[\frac{1}{N}\{S_N - W\}^+\right] = \sum_{n=0}^{N_{max}} \frac{np_n}{\mu_N} \frac{1}{n} E\{S_N - W\}^+ = \frac{\sigma}{\mu_N} E\left[\left\{\frac{S_N - \mu_N \mu_X}{\sigma} - \frac{\mu}{\sigma}\right\}^+\right].$$

$$E[R] = \mu_X - \frac{\sigma}{\mu_N} E\left[\left\{Z - \frac{\mu}{\sigma}\right\}^+\right] = \mu_X - \frac{\sigma}{\sqrt{2\pi}\,\mu_N} e^{-\frac{\mu^2}{2\sigma^2}} + \frac{\mu}{\mu_N} Q\left(\frac{\mu}{\sigma}\right). \quad \square$$

Accordingly, the distribution of the optimal rates for different states, i.e., $X_l^*$'s, have the same form.

All of the above-cited references are incorporated by reference herein in their entirety.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth.

What is claimed is:

1. A method for integrating voice and data traffic in a wireless network, comprising:
discretizing a wireless transmission at a wireless communication device into frames of fixed length and having an integer number of packets, wherein each such frame is an embedded bit stream comprising: a voice compartment for carrying digitally encoded voice packets representing a voice portion of the transmission and state information representing a state of a call associated with the transmission, and a data compartment for carrying digital data packets representing a data portion of the transmission, wherein said voice and data compartments are separated from one another by a movable boundary that limits a maximum size of said voice compartment;
for each frame that is to be transmitted from the wireless communication device, adjusting a position of the movable boundary based on the state information and thereby allocate an unused portion of said voice compartment of said frame to said data compartment of said frame; and
generating packets at the wireless communication device for a time interval during which a transmission is made for a current frame such that the packets so generated are transmitted in the next frame, wherein the state information in the voice compartment is transmitted in a header of a first packet of the current frame and contains state information for the state of the call of the next frame.

2. The method of claim 1, wherein each frame comprises a voice set-up compartment comprising mini-slots for adding new calls.

3. The method of claim 1, and further comprising storing at the wireless communication device a scheduling list containing identities and states of all ongoing calls in a current frame.

4. The method of claim 3, and further comprising resolving at the wireless communication device overflow associated with multiple calls by selectively dropping packets from the embedded bit stream of some calls.

5. The method of claim 1, wherein the state information represents the state of the call in terms of a rate used by a voice encoder that digitally encodes voice associated with the call.

6. A method for integrating voice and data traffic in a wireless network, comprising:
discretizing a wireless transmission at a wireless communication device into frames of fixed length and having an integer number of packets, wherein each such frame is an embedded bit stream comprising: a voice compartment for carrying digitally encoded voice packets representing a voice portion of the transmission and state information representing a state of a call associated with the transmission, and a data compartment for carrying digital data packets representing a data portion of the transmission, wherein said voice and data compartments are separated from one another by a movable boundary that limits a maximum size of said voice compartment, and wherein each frame comprises a voice set-up compartment comprising mini-slots for adding new calls;
for each frame that is to be transmitted from the wireless communication device, adjusting a position of the movable boundary based on the state information and thereby allocate an unused portion of said voice compartment of said frame to said data compartment of said frame that is to be transmitted from the wireless communication device; and
admitting new calls at the wireless communication device using an admission control policy that determines whether the number of calls is less than a network selected maximum number of admissible calls $N_{max}$.

7. The method of claim 6, wherein $N_{max}$ is set to a value such that an average end-to-end distortion per call, $E[D]$, is less than or equal to a network defined threshold, d.

8. The method of claim 6, wherein $N_{max}$ is set to a value such that a peak-load average distortion, $\bar{E}[D]$, is less than a network defined threshold, d.

9. A computer readable medium storing instructions that, when executed by the computer in a communication device operating on a wireless network, cause the computer to:
  discretize a wireless transmission into frames of fixed length and having an integer number of packets, wherein each such frame is an embedded bit stream comprising: a voice compartment for carrying digitally encoded voice packets representing a voice portion of the transmission and state information representing a state of a call associated with the transmission, and a data compartment for carrying digital data packets representing a data portion of the transmission, wherein said voice and data compartments are separated from one another by a movable boundary that limits a maximum size of said voice compartment;
  for each frame, adjust a position of the movable boundary based on the state information and thereby allocate an unused portion of said voice compartment of said frame to said data compartment of said frame; and
  admit new calls using an admission control policy that determines whether the number of calls is less than a network selected maximum number of admissible calls $N_{max}$.

10. The computer readable medium of claim 9, and further comprising instructions that, when executed by the computer, generate packets for a time interval during which a transmission is made for a current frame such that the packets so generated are transmitted in the next frame.

11. The computer readable medium of claim 9, wherein said instructions that cause the computer to discretize comprise instructions to generate a voice set-up compartment comprising mini-slots for adding new calls.

12. The computer readable medium of claim 9, wherein the instructions that cause the computer to admit comprise instructions that determine whether the number of calls is less than a value for $N_{max}$ that is selected such that an average end-to-end distortion per call, $E[D]$, is less than or equal to a network defined threshold, d.

13. The computer readable medium of claim 9, wherein the instructions that cause the computer to admit comprise instructions that determine whether the number of calls is less than a value for $N_{max}$ that is selected such that a peak-load average distortion, $\bar{E}[D]$, is less than a network defined threshold, d.

14. The communications network of claim 9, wherein each of the wireless communication devices is configured to store a scheduling list containing identities and states of all ongoing calls in a current frame.

15. The communications network of claim 14, wherein each of the wireless communication devices is configured to resolve overflow associated with multiple calls by selectively dropping packets from the embedded bit stream of some calls.

16. The computer readable medium of claim 9, wherein the instructions that cause the computer to generate the state information comprise instructions that generate the state information in terms of a rate used by a voice encoder that digitally encodes voice associated with the call.

17. A communications network comprising;
  a plurality of wireless communication devices, each of is configured to communicate according to a communication protocol to:
    discretize a wireless transmission into network frames of fixed length and having an integer number of packets, wherein each such frame is an embedded bit stream comprising: a voice compartment for carrying digitally encoded voice packets and state information representing a state of a call associated with the transmission, and a data compartment for carrying digital data packets representing a data portion of the transmission, wherein said voice and data compartments are separated from one another by a movable boundary that limits the maximum size of said voice compartment;
    for each frame, adjust a position of the movable boundary based on the state information and thereby allocate an unused portion of said voice compartment of said frame to said data compartment of said frame; and
    generate packets for a time interval during which a transmission is made for a current frame such that the packets so generated are transmitted in the next frame, wherein the state information of the voice compartment is transmitted in a header of a first packet of the current frame and contains state information for the state of the call of the next frame.

18. The communications network of claim 17, wherein each wireless communication device is configured to generate a voice set-up compartment comprising mini-slots for adding new calls.

19. The communications network of claim 17, wherein each wireless communication device is configured to generate the state information in terms of a rate used by a voice encoder that digitally encodes voice associated with the call.

20. A communications network comprising:
  a plurality of wireless communication devices, each of is configured to communicate according to a communication protocol to:
    discretize a wireless transmission into network frames of fixed length and having an integer number of packets, wherein each such frame is an embedded bit stream comprising: a voice compartment for carrying digitally encoded voice packets and state information representing a state of a call associated with the transmission, and a data compartment for carrying digital data packets representing a data portion of the transmission, wherein said voice and data compartments are separated from one another by a movable boundary that limits the maximum size of said voice compartment;
    for each frame, adjust a position of the movable boundary based on the state information and thereby allocate an unused portion of said voice compartment of said frame to said data compartment of said frame; and
  admit new calls using an admission control policy that determines whether the number of calls is less than a network selected maximum number of admissible calls $N_{max}$.

21. The communications network of claim 20, wherein each of the wireless communication devices is configured to determine whether the number of calls is less than a value for $N_{max}$ that is selected such that an average end-to-end distortion per call, $E[D]$, is less than or equal to a network defined threshold, d.

22. The communications network of claim 20, wherein each of the wireless communication devices is configured to determine whether the number of calls is less than a value for $N_{max}$ that is selected such that a peak-load average distortion, $\bar{E}[D]$, is less than a network defined threshold, d.

* * * * *